United States Patent
Kuroda

(10) Patent No.: US 11,520,822 B2
(45) Date of Patent: *Dec. 6, 2022

(54) INFORMATION PROVIDING SYSTEM AND INFORMATION PROVIDING METHOD

(71) Applicant: INFORMATION SYSTEM ENGINEERING INC., Tokyo (JP)

(72) Inventor: Satoshi Kuroda, Tokyo (JP)

(73) Assignee: INFORMATION SYSTEM ENGINEERING INC., Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 16/765,130

(22) PCT Filed: Feb. 13, 2020

(86) PCT No.: PCT/JP2020/005544
§ 371 (c)(1),
(2) Date: May 18, 2020

(87) PCT Pub. No.: WO2020/202824
PCT Pub. Date: Oct. 8, 2020

(65) Prior Publication Data
US 2021/0157841 A1    May 27, 2021

(30) Foreign Application Priority Data
Mar. 29, 2019   (JP) .............................. JP2019-069368

(51) Int. Cl.
*G06F 16/00*    (2019.01)
*G06F 16/738*   (2019.01)
(Continued)

(52) U.S. Cl.
CPC ........ *G06F 16/738* (2019.01); *G06F 16/7867* (2019.01); *G06N 20/00* (2019.01)

(58) Field of Classification Search
CPC ............... G06F 16/738; G06F 16/7867; G06F 16/9035; G06F 16/908; G06F 16/245;
(Continued)

(56) References Cited

U.S. PATENT DOCUMENTS 7,039,625 B2    5/2006  Kim et al.
8,196,212 B2 *  6/2012  Tsusaka .............. G06F 21/6245
                                                    713/166
(Continued)

FOREIGN PATENT DOCUMENTS

CN        1532621 A      9/2004
CN      101855633 A     10/2010
(Continued)

OTHER PUBLICATIONS

International Search Report (ISR) and WrittenOpinion dated Apr. 28, 2020 issued in International Application No. PCT/JP2020/013358.

(Continued)

*Primary Examiner* — Noosha Arjomandi
(74) *Attorney, Agent, or Firm* — Holtz, Holtz & Volek PC

(57) ABSTRACT

A content model data base stores past target information, which includes past first video information acquired in advance, reference IDs, which are linked with the past target information, and which correspond to contents, and three or more levels of degrees of content association between the past target information and the reference IDs. A first acquiring unit acquires the target information from a user terminal, a first evaluation unit looks up the content model database and acquires ID information, which includes the degrees of content association between the target information and the reference IDs, and a judging unit judges the ID information.

(Continued)

Contents that correspond to the ID information are output to the user terminal based on the result of judgment by the judging unit.

13 Claims, 21 Drawing Sheets

(51) Int. Cl.
*G06N 20/00* (2019.01)
*G06F 16/78* (2019.01)

(58) Field of Classification Search
CPC ............... G06F 16/3331; G06F 16/835; G06F 16/90335; G06N 20/00; G06V 20/20
See application file for complete search history.

(56) References Cited

U.S. PATENT DOCUMENTS

| | | | |
|---|---|---|---|
| 8,442,268 B2 | 5/2013 | Isogai et al. | |
| 8,799,401 B1 | 8/2014 | Bryar et al. | |
| 9,164,506 B1 | 10/2015 | Zang | |
| 10,643,073 B2 | 5/2020 | Sugaya | |
| 11,222,081 B2 | 1/2022 | Whigham et al. | |
| 2003/0126129 A1 | 7/2003 | Watson | |
| 2004/0183918 A1 | 9/2004 | Squilla et al. | |
| 2004/0230564 A1 | 11/2004 | Simon et al. | |
| 2005/0171661 A1 | 8/2005 | Abdel-Malek et al. | |
| 2006/0123000 A1 | 6/2006 | Baxter et al. | |
| 2006/0287993 A1 | 12/2006 | Yao et al. | |
| 2007/0188626 A1 | 8/2007 | Squilla et al. | |
| 2008/0028362 A1* | 1/2008 | Ugai ...................... | G06Q 10/06 717/101 |
| 2008/0120282 A1 | 5/2008 | Liberty et al. | |
| 2009/0265313 A1 | 10/2009 | Wang | |
| 2011/0093449 A1 | 4/2011 | Belenzon et al. | |
| 2011/0222832 A1 | 9/2011 | Aizawa | |
| 2011/0238668 A1 | 9/2011 | Matsumoto | |
| 2011/0243453 A1 | 10/2011 | Kashima et al. | |
| 2012/0075343 A1 | 3/2012 | Chen et al. | |
| 2012/0086792 A1 | 4/2012 | Akbarzadeh et al. | |
| 2012/0209470 A1 | 8/2012 | Gilbert et al. | |
| 2013/0010068 A1 | 1/2013 | Tiernan et al. | |
| 2013/0138696 A1 | 5/2013 | Turdakov et al. | |
| 2013/0215264 A1 | 8/2013 | Soatto et al. | |
| 2013/0266228 A1 | 10/2013 | Markson et al. | |
| 2014/0009476 A1 | 1/2014 | Venkitaraman et al. | |
| 2014/0355879 A1 | 12/2014 | Agosta et al. | |
| 2015/0253977 A1 | 9/2015 | Kang | |
| 2016/0019212 A1* | 1/2016 | Soldani .................. | G06V 10/17 345/633 |
| 2016/0026900 A1 | 1/2016 | Ando | |
| 2016/0287987 A1 | 10/2016 | Onda et al. | |
| 2016/0342681 A1 | 11/2016 | Kesin | |
| 2017/0124447 A1 | 5/2017 | Chang et al. | |
| 2017/0344958 A1 | 11/2017 | Lumera et al. | |
| 2018/0101791 A1 | 4/2018 | Viswanathan | |
| 2019/0019166 A1 | 1/2019 | Vahid | |
| 2019/0045158 A1 | 2/2019 | Osanai et al. | |
| 2019/0108411 A1* | 4/2019 | Liu .......................... | G06F 16/55 |
| 2019/0163975 A1* | 5/2019 | Desai ..................... | G06V 20/20 |
| 2019/0171886 A1 | 6/2019 | Ashour et al. | |
| 2019/0236489 A1 | 8/2019 | Koudal et al. | |
| 2019/0278992 A1 | 9/2019 | Hossain et al. | |
| 2019/0286942 A1 | 9/2019 | Abhiram et al. | |
| 2019/0325299 A1* | 10/2019 | Oliveira Pinheiro ........................ | G06N 3/0472 |
| 2019/0333633 A1 | 10/2019 | Sugaya | |
| 2019/0362243 A1 | 11/2019 | Matsumura | |
| 2020/0019780 A1 | 1/2020 | Sugaya | |
| 2020/0058001 A1 | 2/2020 | Naritake et al. | |
| 2020/0210850 A1 | 7/2020 | Nuthi et al. | |
| 2021/0089824 A1* | 3/2021 | Ge ......................... | G06K 9/6267 |
| 2021/0157841 A1* | 5/2021 | Kuroda .................. | G06F 16/738 |
| 2021/0157842 A1* | 5/2021 | Kuroda .................. | G06F 16/908 |
| 2021/0365685 A1* | 11/2021 | Shah ....................... | G06T 7/0002 |
| 2021/0375487 A1* | 12/2021 | Kuroda .................. | G16H 40/20 |

FOREIGN PATENT DOCUMENTS

| | | |
|---|---|---|
| CN | 106920071 A | 7/2017 |
| EP | 2775408 A1 | 9/2014 |
| JP | 2006309486 A | 11/2006 |
| JP | 2010003190 A | 1/2010 |
| JP | 2011090348 A | 5/2011 |
| JP | 2011170690 A | 9/2011 |
| JP | 2014085730 A | 5/2014 |
| JP | 2014238680 A | 12/2014 |
| JP | 2017224133 A | 12/2017 |
| JP | 6267841 B1 | 1/2018 |
| JP | 2018049421 A | 3/2018 |
| JP | 6321879 B1 | 5/2018 |
| JP | 2018092227 A | 6/2018 |
| JP | 2018097437 A | 6/2018 |
| JP | 2018097580 A | 6/2018 |
| JP | 2018101353 A | 6/2018 |
| JP | 2018194949 A | 12/2018 |
| JP | 2018206085 A | 12/2018 |
| JP | 2018206341 A | 12/2018 |
| JP | 2019021150 A | 2/2019 |
| JP | 2019032593 A | 2/2019 |
| JP | 2019109844 A | 7/2019 |
| JP | 6651190 B1 | 2/2020 |
| KR | 102419018 B1 | 7/2022 |
| WO | 2011105671 A1 | 9/2011 |
| WO | 2017169907 A1 | 10/2017 |
| WO | 2017216929 A1 | 12/2017 |
| WO | 2018100878 A1 | 6/2018 |

OTHER PUBLICATIONS

International Search Report (ISR) and Written Opinion dated Apr. 7, 2020 issued in International Application No. PCT/JP2020/005545.

International Search Report (ISR) and Written Opinion dated Aug. 13, 2019 issued in International Application No. PCT/JP2019/028626.

International Search Report (ISR) and Written Opinion dated Jun. 16, 2020 issued in International Application No. PCT/JP2020/013352.

International Search Report (ISR) and Written Opinion dated Jun. 16, 2020 issued in International Application No. PCT/JP2020/013357.

International Search Report (ISR) and Written Opinion dated May 18, 2021 issued in International Application No. PCT/JP2021/010015.

International Search Report (ISR) and Written Opinion dated Oct. 27, 2020 issued in International Application No. PCT/JP2020/029033.

U.S. Appl. No. 17/417,987, First Named Inventor: Satoshi Kuroda; Title: "Information Processing Device and Information Processing Method"; filed Jun. 24, 2021.

Related U.S. Appl. No. 16/604,079; First Named Inventor: Satoshi Kuroda; Title: "Information Service System and Information Service Method"; filed Oct. 9, 2019.

Related U.S. Appl. No. 16/765,139; First Named Inventor: Satoshi Kuroda; Title: "Information Providing System and Information Providing Method"; filed May 18, 2020.

International Search Report (ISR) and Written Opinion dated Apr. 7, 2020 issued in International Application No. PCT/JP2020/005544.

Office Action (Non-Final Rejection) dated Mar. 2, 2022 issued in related U.S. Appl. No. 16/962,085.

Related U.S. Appl. No. 16/962,055; First Named Inventor: Satoshi KURODA; Title: "Learning Method and Information Providing System"; filed Jul. 14, 2020.

Related U.S. Appl. No. 16/962,085; First Named Inventor: Satoshi Kuroda; Title: "Information Providing System"; filed Jul. 14, 2020.

(56) References Cited

OTHER PUBLICATIONS

Related U.S. Appl. No. 16/962,113; First Named Inventor: Satoshi Kuroda; Title: "Learning Method and Information Providing System"; filed Jul. 14, 2020.
Related U.S. Appl. No. 16/972,273; First Named Inventor: Satoshi Kuroda; Title: "Information Providing System"; filed Dec. 4, 2020.
Related U.S. Appl. No. 17/029,980; First Named Inventor: Satoshi Kuroda; Title: "Information Providing System"; filed Sep. 23, 2020.
Chinese Office Action (and English language translation thereof) dated Jun. 21, 2021, issued in Chinese Application No. 201980003667.8 (which is a Chinese counterpart of related U.S. Appl. No. 16/604,079).
Notice of Allowance dated Jan. 14, 2022, issued in related U.S. Appl. No. 16/604,079.
U.S. Appl. No. 16/962,085, filed Jul. 14, 2020.
U.S. Appl. No. 16/962,113, filed Jul. 14, 2020.
U.S. Appl. No. 16/962,055, filed Jul. 14, 2020.
Office Action (Non-Final Rejection) dated Apr. 13, 2022, issued in related U.S. Appl. No. 16/765,139.
Office Action (Non-Final Rejection) dated Mar. 28, 2022, issued in related U.S. Appl. No. 17/029,980.
Lu., et al., "Exploratory Product Image Search With Circle-to-Search Interaction", in IEEE Transactions on Circuits and Systems for Video Technology, vol. 25, No. 7, pp. 1190-1202, Jul. 2015, doi: 10.1109/TCSVT .2014.2372272. (Year 2015).
Office Action (Final Rejection) dated Aug. 10, 2022, issued in related U.S. Appl. No. 16/962,085.
Office Action (Final Rejection) dated Sep. 20, 2022, issued in related U.S. Appl. No. 17/029,980.

* cited by examiner

FIG. 5A

SCENE MODEL TABLE

| SCENE ID | LEARNING MODEL |
|---|---|
| OFE | ... |
| OFD | ... |
| : | : |

FIG. 5B

SCENE CONTENT MODEL TABLE (OFE)

| CONTENT ID | LEARNING MODEL |
|---|---|
| 1B827-02 | ... |
| [NULL] | ... |
| : | : |

FIG. 6A

SCENE TABLE

| SCENE ID | SCENE NAME |
|---|---|
| 0FD | RESTART ABC-999 DEVICE |
| 0FE | REMOVE MEMORY FROM ABC-999 DEVICE |
| ⋮ | ⋮ |

FIG. 6B

CONTENT TABLE

| SCENE ID | CONTENT ID | CONTENT | SUMMARY | HASH VALUE |
|---|---|---|---|---|
| 0FE | 1B827-02 | 1B827-02/1.pdf | STEP 1: REMOVE THE SCREWS AT THE FOUR CORNERS, AND HOLD FIRMLY WITH BOTH HANDS … | 564544d8f0b746e |
| 0FE | 1B828-02 | 1B828-02/2.pdf | STEP 2: LIFT UP THE TOP PLATE IN A HORIZONTAL STATE … | 4d8f0b746e56454 |
| [NULL] | 38D92-01 | 38D92-01/info.mov | [MOVIE] 3:08 | ef984e9e1e20e16 |
| ‥ | ‥ | ‥ | ‥ | ‥ |

FIG. 6C

TRANSITION INFORMATION TABLE

| SCENE ID | CONTENT ID | ORDER |
|---|---|---|
| OFE | 1B827-02 | 1 |
| OFE | 1B828-02 | 2 |
| ⋮ | ⋮ | ⋮ |

FIG. 7A

NAME CACHE TABLE

| SCENE ID | SCENE NAME |
|---|---|
| OFD | RESTART ABC-999 DEVICE |
| OFE | REMOVE MEMORY FROM ABC-999 DEVICE |
| .. | .. |

FIG. 7B

SUMMARY CACHE TABLE

| CONTENT ID | SUMMARY |
|---|---|
| 1B827-02 | STEP 1: REMOVE THE SCREWS AT THE FOUR CORNERS, AND HOLD FIRMLY WITH BOTH HANDS …. |
| 1B828-02 | STEP 2: LIFT UP THE TOP PLATE IN A HORIZONTAL STATE … |
| 38D92-01 | [MOVIE] 3:08 |
| .. | .. |

FIG. 8A

META-TABLE

| REFERENCE ID | CONTENT ID | META ID |
|---|---|---|
| A | 1B827-02 | 24FD |
|   | 1B828-02 | 83D9 |
|   | : | : |
| B | ... | ... |
| : | : | : |

FIG. 8B

META-CATEGORY MASTER TABLE

| CATEGORY ID | CATEGORY NAME |
|---|---|
| 025 | COLOR |
| 394 | WEIGHT |
| : | : |

FIG. 8C

META-MASTER TABLE

| CATEGORY ID | META ID | META VALUE |
|---|---|---|
| 394 | 24FD | LIGHT |
| 025 | 83D9 | WHITE |
| : | : | : |

INFORMATION PROVIDING SYSTEM AND INFORMATION PROVIDING METHOD

TECHNICAL FIELD

The present invention relates to an information providing system and an information providing method for narrowing down a plurality of contents to output to a user terminal based on video information acquired from the user terminal.

BACKGROUND ART

In recent years, with the development of technologies such as image recognition technology, virtual reality (VR), augmented reality (AR), mixed reality (MR) and so forth, a method has been disclosed, whereby various pieces of information are presented for reference, in an overlapping manner, via a display unit that is mounted on the user's head, referred to as a "head-mounted video display device (HMD (Head-Mounted Display))". For example, the wearable terminal display system of Patent Document 1 has been proposed as a method for displaying a predicted harvest time of the crop that can be seen through the display panel of the wearable terminal, on the display panel, as augmented reality.

The wearable terminal display system of Patent Document 1 takes an image of the crop that enters the wearable terminal's field of view with a camera, analyzes the image and identifies the type of the crop, selects a criterion that is suitable for the type of the crop, analyzes the image and determines the color and size based on the criterion, predicts the harvest time of the crop, and displays the predicted harvest time on the wearable terminal's display panel as augmented reality.

Furthermore, for example, the work support system of Patent Document 2 has been proposed as a method for identifying the object to work upon, based on rules such as a work manual and displaying work-support information, as augmented reality, on the display panel of the worker's wearable terminal.

The work support system of Patent Document 2 generates rules that describe the conditions for identifying the work object or the situation of work based on the elements of a manual that describe the procedures, contents, points of attention or other matters that are related to the work, learns rules that are optimized so that a model case gains the highest evaluation, recognizes the work object and the situation of work based on sensor information that is acquired by using a sensor, and outputs work-support information based on the rules generated and a recognition means' recognition results.

CITATION LIST

Patent Literature

Patent Literature 1: Japanese Patent No. 6267841
Patent Literature 2: Japanese Patent No. 6321879

SUMMARY OF INVENTION

Problem to be Solved by the Invention

Now, when, for example, an anomaly occurs with a device that is installed at the user's site or the like during work such as maintenance or repair of devices in the field (work site), it is then necessary to stop the device after the anomaly occurs, until measures are in place. This raises the concern that the operations and services at the user's site or the like are affected.

For example, devices that are installed on a production line in a factory may be installed on the line at varying times, and configured by combining a plurality of devices and modules. Consequently, identifying the location of an anomaly requires checking the operating status, the configurations of parts and so forth, of peripheral devices.

Also, for example, escalators and elevators installed, at train stations and commercial facilities, or devices in outdoor parking lots, have complex device structures, and, in addition, there are cases where parts and so forth are replaced after these devices are installed and where these replacement parts have different shapes, part numbers and so forth. In some cases, an anomaly is found only after a device is disassembled, and, in certain cases, does not even match the contents described in the maintenance manual. Consequently, in addition to the information in the manual of the device, it is necessary to have an understanding of related parts, the procedures for replacement with alternative parts, and so forth.

However, in actual fields, the presence of such experienced expert engineers is decreasing year by year, and, in the future, less experienced and relatively young engineers will have to deal with these matters, so as to develop human resources. Alternatively, it is anticipated that foreign engineers or the like who have come to Japan from overseas and have completed training in device maintenance and repair will deal with these matters.

In this regard, according to the technology disclosed in Patent Document 1, prediction results are displayed based on results of judging the appearance and the like of the crop. Consequently, it is difficult to narrow down the information to provide, in a sequential manner, based on various field environments, the conditions in which the device is installed, the configuration of the device, and so forth.

Furthermore, the technique disclosed in Patent Document 2 simply supports work by generating a learning model based on rules set forth in a manual. Consequently, when the actual field or the configuration of the device changes and no longer matches the contents or the procedures described in the manual used for learning, it is difficult to make flexible reactions or judgment in the field. A learning model has to be generated every time dealing with a new situation, and this requires time and costs. For this reason, it is difficult to provide information that is suitable for the actual field and the work, or update the target information in an efficient way.

So, the present invention has been made in view of the above, and it is an object of the present invention to provide an information providing system and an information providing method to allow identifying prediction results that are suitable for the situation of the field, and providing optimal contents.

Means for Solving the Problem

The information providing system according to the first invention is an information providing system for narrowing down a plurality of contents to output to a user terminal, based on target information, which includes first video information acquired from the user terminal, with reference to a database, and the information providing system has a content model database that stores past target information, which includes past first video information acquired in advance, reference IDs, which are linked with the past target information, and which correspond to the contents, and three or more levels of degrees of content association, which show the degrees of content association between the past target information and the reference IDs, a first acquiring means for acquiring the target information from the user terminal, a first evaluation means for looking up the content model database, and acquiring ID information, which includes the degrees of content association between the target information and the reference IDs, a judging means for judging the ID information, and an output means for outputting the contents, which correspond to the ID information, to the user terminal, based on a result of judgement in the judging means.

Based on the first invention, in the information providing system according to the second invention, the output means has a first generation means for generating a reference ID list, which includes a plurality of pieces of ID information, based on the result of judgement, a second acquiring means for acquiring a first reference ID, which is included in the reference ID list, and a content output means for outputting content, which corresponds to the first reference ID.

Based on the second invention, in the information providing system according to the third invention, the output means has, following the first generation means, a second generation means for generating a reference summary list, which includes a plurality of summaries, corresponding respectively to the plurality of pieces of ID information included in the reference ID list, and the second acquiring means acquires a first summary, which is selected from the reference summary list via the user terminal, and acquires the first reference ID, which corresponds to the first summary, from the reference ID list.

Based on any one of the first invention to the third invention, in the information providing system according to the fourth invention, the database has a transition information table, in which order information related to content outputs corresponding to the ID information is stored in advance, and the judging means looks up the transition information table, and judges whether or not the order information related to the content outputs corresponding to the ID information is present.

Based on the fourth invention, in the information providing system according to the fifth invention, when there is no order information related to the content outputs corresponding to the acquired ID information in the order information, the judging means judges that there is no content that corresponds to the ID information.

Based on any one of the first invention to the fifth invention, in the information providing system according to the sixth invention, the database has a scene model database that stores past second video information, which is acquired in advance, scene information, which includes scene IDs linked with the past second video information, and three or more levels of degrees of scene association between the past second video information and the scene information, a third acquiring means for acquiring target information, which includes the second video information, from the user terminal, before acquiring the target information from the user terminal, a second evaluation means for looking up the scene model database, and acquiring a scene ID list, which includes degrees of scene association between the second video information and the scene information, and a third generation means for generating a scene name list, which includes a plurality of scene names corresponding to the scene ID list, and the third acquiring means acquires the target information, which includes the second video information and scene IDs corresponding to scene names selected from the scene name list, from the user terminal.

Based on the sixth invention, the information providing system according to the seventh invention further has a scene ID generation unit, and the scene ID generation unit has a scene name acquiring means for acquiring scene names corresponding to the past first video information and the past second video information, which are acquired in advance, and a scene ID generation means for generating scene IDs with smaller amounts of information than the scene names, for each of the scene names acquired, and a first learning means for generating the scene model database by way of machine learning using the scene information and the past second video information.

Based on the sixth invention or the seventh invention, the information providing system according to the eighth invention further has a content ID generation unit, and the content ID generation unit has a content acquiring means for acquiring the past second video information, which is acquired in advance, and contents corresponding to the past second video information, a content ID generation means for generating content IDs with smaller amounts of information than the contents, for each of the contents acquired, and a second learning means for generating the content model database by way of machine learning using reference information and the past target information.

Based on the eighth invention, in the information providing system according to the ninth invention, the content IDs are associated with a plurality of pieces of meta information.

Based on any one of the sixth invention to the ninth invention, in the information providing system according to the tenth invention, the user terminal further has a receiving means for receiving the scene ID list acquired by the second evaluation means, a judging means for judging whether or not a scene ID included in the received scene ID list is present in a cache area of the user terminal, based on a result of receiving the scene ID list, and an inquiring means for making an inquiry to a content information database holding contents, when, according to a result of the judgement, the scene ID is not present in the cache area of the user terminal.

Based on any one of the sixth invention to the ninth invention, in the information providing system according to the eleventh invention, the user terminal has a receiving means for receiving the reference ID list acquired in the first acquiring means, a judging means for judging whether a reference ID included in the received reference ID list is present in a cache area of the user terminal, based on a result of receiving the reference ID list, and an inquiring means for making an inquiry to a content information database holding contents, when, according to a result of the judgement, the reference ID is not present in the cache area of the user terminal.

Based on any one of the sixth invention to the eleventh invention, in the information providing system according to the twelfth invention, the user terminal has a display unit that is mounted on a head or glasses and that displays information generated based on the first video information acquired from the user terminal, in a transparent state.

Based on any one of the sixth invention to the twelfth invention, in the information providing system according to the thirteenth invention, the contents include information of at least part or all of text, illustration, video, and audio.

The information providing method according to the fourteenth invention is an information providing method for narrowing down a plurality of contents to output to a user terminal with reference to a database, based on first video information acquired from the user terminal, and this information providing method includes a storage step of making the content model data base store past target information, which includes past first video information acquired in advance, reference IDs, which are linked with the past target information, and which correspond to the contents, and three or more levels of degrees of content association, which show the degrees of content association between the past target information and the reference IDs, a first acquiring step of acquiring the target information from the user terminal, a first evaluation step of looking up the content model database, and acquiring ID information, which includes the degrees of content association between the target information and the reference IDs, a judging step of judging the ID information, and an output step of outputting the contents, which correspond to the ID information, to the user terminal, based on a result of judgement in the judging step.

Advantageous Effects of Invention

According to the first invention to the thirteenth invention, the first acquiring means looks up the content model database, and acquires ID information that includes the degrees of content association between target information and reference IDs. The judging means judges the ID information. The output means outputs contents that correspond to the ID information, to the user terminal, based on the result of judgement. By this means, it is possible to judge prediction results that match the situation of the field. By this means, optimal contents can be provided.

In particular, according to the second invention, the first generation means generates a reference ID list, and the second acquiring means acquires corresponding first reference IDs via the user terminal. Consequently, the user terminal can select the first reference IDs from the reference ID list generated according to the result of judgement. This makes it possible to acquire and provide appropriate information in an efficient manner.

In particular, according to the third invention, the second acquiring means acquires a first summary that is selected from the reference summary list, via the user terminal. Consequently, the corresponding first reference ID can be acquired. This makes it possible to acquire and provide appropriate information in an efficient manner.

In particular, according to the fourth invention, the transition information table stores, in advance, order information related to content outputs corresponding to the ID information. Consequently, the judging means can judge whether or not there is order information related to the content outputs corresponding to the ID information. This makes it possible to acquire and provide appropriate information in an efficient manner.

In particular, according to the fifth invention, the judging means judges that there is no order information that relates to content outputs corresponding to the acquired ID information in the order information. Consequently, it is possible to make judgement even when there is no content that corresponds to the ID information. By this means, even when no content that corresponds to the ID information is present, it is possible to prevent contents having low degrees of association from being output, and acquire and provide appropriate information in an efficient manner.

In particular, according to the sixth invention, a scene model database is provided, and the third generation means generates a scene name list. Consequently, the first acquiring means can acquire scene IDs from the scene name list. This makes it possible to acquire and provide appropriate information in an efficient manner.

Also, according to the seventh invention, a scene ID generation unit is provided. The scene ID generation unit has a scene name acquiring means, a scene ID generation means, and a first learning means. Consequently, scene IDs with smaller amounts of information than scene names are generated per scene name that is acquired. As a result of this, it is possible to save the amount of communication to be exchanged, so that quick response is made possible. Furthermore, when updating one database, it is only necessary to correct the target ID alone, and there is no need to update the other database.

According to the eighth invention, a content ID generation unit is provided. The content ID generation unit has a content acquiring means, a content ID generation means, and a second learning means. Consequently, first content IDs with smaller amounts of information than content information are generated from the acquired content information. As a result of this, it is possible to save the amount of communication to be exchanged, so that quick response is made possible. Furthermore, when updating one database, it is only necessary to correct the target ID alone, and there is no need to update the other database.

Furthermore, according to the ninth invention, the content information includes meta information. Consequently, more detailed attributes can be added to the content information. By this means, accurate contents can be assigned or provided, and appropriate information can be acquired and provided in an efficient manner.

Also, according to the tenth invention, the user terminal has a receiving means, a judging means, and an inquiring means. By this means, it is possible to judge whether or not the scene IDs included in the received scene ID list are present in the cache area. Therefore, only when there are no corresponding scene IDs in the user terminal, corresponding scene IDs are acquired from another scene model database. By this means, states can be narrowed down according to the conditions of the field, and appropriate information can be acquired and provided in an efficient manner.

According to the eleventh invention, the user terminal has a receiving means, a judging means, and an inquiring means. Consequently, it is possible to judge whether or not the content IDs included in the received content ID list are present in the cache area. Therefore, only when there are no corresponding scene IDs in the user terminal, corresponding scene IDs are acquired from another scene model database. By this means, states can be narrowed down according to the conditions of the field, and appropriate information can be acquired and provided in an efficient manner.

According to the twelfth invention, the user terminal has a display unit that is mounted on the head or glasses, and that displays information generated based on the first video information acquired from the user terminal, in a transparent state. Consequently, hand-free operations can be performed when performing operations in the field. By this means, appropriate information can be acquired and provided in an efficient manner, both hands can be used freely, and appropriate information can be acquired and provided in an efficient manner.

Furthermore, according to the thirteenth invention, the contents include information of at least part or all of text, illustrations, video, and audio. Consequently, a variety of contents can be provided. This makes it possible to acquire and provide appropriate information in an efficient manner.

According to the fourteenth invention, in the first acquiring step, ID information, which includes the degrees of content association between target information and reference IDs, is acquired with reference to the content model database. The judging step judges the ID information. The output step outputs contents that correspond to the ID information, to the user terminal, based on the result of judgement. By this means, it is possible to judge prediction results that match the situation of the field. By this means, optimal contents can be provided.

BRIEF DESCRIPTION OF DRAWINGS

FIG. 5A is a schematic diagram to show an example of the configuration of the scene model table according to the present embodiment, and FIG. 5B is a schematic diagram to show an example of the configuration of the scene content model table (for OFE);

FIG. 6A is a schematic diagram to show an example of the scene table according to the present embodiment, FIG. 6B is a schematic diagram to show an example of the content table according to the present embodiment, and FIG. 6C is a schematic diagram to show an example of the transition information table according to the present embodiment;

FIG. 7A is a schematic diagram to show an example of the configuration of the name cache table according to the present embodiment, and FIG. 7B is a schematic diagram to show an example of the configuration of the summary cache table according to the present embodiment;

FIG. 8A is a schematic diagram to show an example of the configuration of the meta-table according to the present embodiment, FIG. 8B is a schematic diagram to show an example of the configuration of a meta-category master table according to the present embodiment, and FIG. 8C is a schematic diagram to show an example of the configuration of the meta-master table according to the present embodiment;

DESCRIPTION OF EMBODIMENTS

Hereinafter, examples of information providing systems and information providing methods according to embodiments of the present invention will be described with reference to the accompanying drawings.

Figure 1:
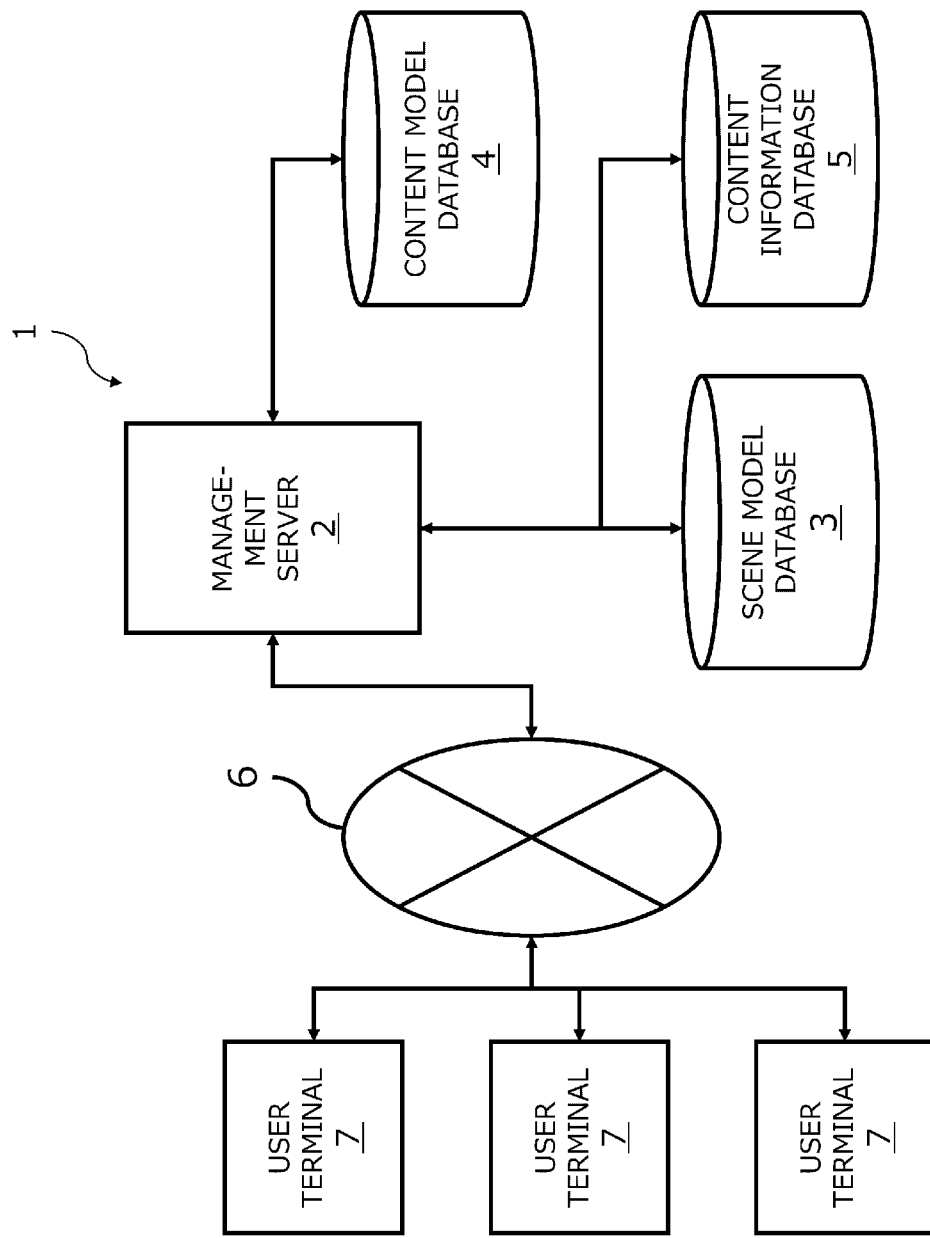
FIG. 1 is a block diagram to show an example of the configuration of the information providing system according to the present embodiment.

FIG. 1 is a schematic diagram to show an example of an information providing system 1, to which the invention according to the present embodiment is applied.

First Embodiment

An example of the configuration of the information providing system 1 according to the first embodiment will be described with reference to FIGS. 1 to 14. FIG. 1 is a block diagram to show an overall configuration of the information providing system 1 according to the present embodiment.

As shown in FIG. 1, the information providing system 1 has a management server 2, a scene model database 3, a content model database 4 and a content information database 5. The management server 2 is, for example, connected to a user terminal 7, which is provided to a worker in the field (site), via a public communication network 6.

The management server 2 is used, for example, to perform work such as maintenance, safeguarding, repair, etc. of devices installed in the field. The management server 2 acquires, for example, video information of devices or the like acquired from the user terminal 7 in the field. The management server 2 acquires each data, evaluates the data, and outputs information, with reference to the scene model database 3 and the content model database 4.

The scene model database 3 stores past first video information, which is acquired in advance, scene information, which includes scene IDs linked with the past first video information, and three or more levels of degrees of scene association, which represent the degrees of scene association between the past first video information and the scene information. The content model database 4 stores past target information, in which past second video information, which is acquired in advance, and a scene ID, which has been mentioned earlier, form a pair, reference IDs, which are linked with the past target information, and which correspond to contents, and three or more levels of degrees of content association, which represent the degrees of content association between the past target information and the reference IDs. For example, results that are built based on target information and reference IDs (content IDs) are stored in the content model database. The content information database 5 records, for example, contents. The contents may include, for example, product introduction movies, solution manual movies and so forth, as well as document-related materials such as device manuals, instruction manuals, catalogs, reports and so forth. The contents are registered, for example, by the administrator of each content. The contents to be registered may be, for example, files such as audio files and the like, and may be files such as audio files of foreign language translations corresponding to Japanese. For example, when one country's language is registered in audio, a translated audio file of a foreign language corresponding to the registered audio file may be stored together. To register and update these contents, each manufacturer's administrator or the person in charge of preparing manuals, for example, my operate terminal devices via the public communication network 6 (network). Furthermore, for example, a business to take care of the management and the like, for which the administrator or the person in charge of preparing manuals is responsible, may perform these operations all together.

The public communication network 6 is an Internet network or the like, to which the information providing system 1 and the management server 2 are connected via a communication circuit. The public communication network 6 may be constituted by a so-called optical-fiber communication network. Furthermore, the public communication network 6 is not limited to a cable communication network, and may be realized in the form of a wireless communication network.

<User Terminal 7>

The user terminal 7 has a display unit that is integrally or partly mounted on the worker's head or glasses, and that displays information generated based on a variety of types of video information acquired from the user terminal 7, in a transparent state. For example, the user terminal 7 may be HoloLens (registered trademark), which is one type of HMD (Head-Mounted Display). The worker can check the work area and the device to evaluate, through the display unit that shows display information of the user terminal 7 in a transparent manner, such as a head-mounted display or HoloLens. This allows the worker to watch the situation at hand, and check a scene name list, a reference summary list and contents together, which are generated based on a variety of types of video information acquired.

Furthermore, besides electronic devices such as a mobile phone (mobile terminal), a smartphone, a tablet terminal, a wearable terminal, a personal computer, an IoT (Internet of Things) device and so forth, any electronic device can be used to implement the user terminal 7. The user terminal 7 may be, for example, connected to the information providing system 1 via the public communication network 6, and, besides, for example, the user terminal 7 may be directly connected to the information providing system 1. The user may use the user terminal 7 to acquire a variety of types of reference information from the information providing system 1, and, besides, control the information providing system 1, for example.

Furthermore, the user terminal 7 has a receiving means that receives a scene ID list acquired by a third evaluation means or a reference ID list acquired by a second acquiring means, a judging means that checks whether a target ID is present in the cache area of the user terminal 7, and an inquiring means that, when the target ID is not present in the cache area of the user terminal 7, makes an inquiry to the corresponding content information database 5.

<Scene Model Database 3>

Figure 2:
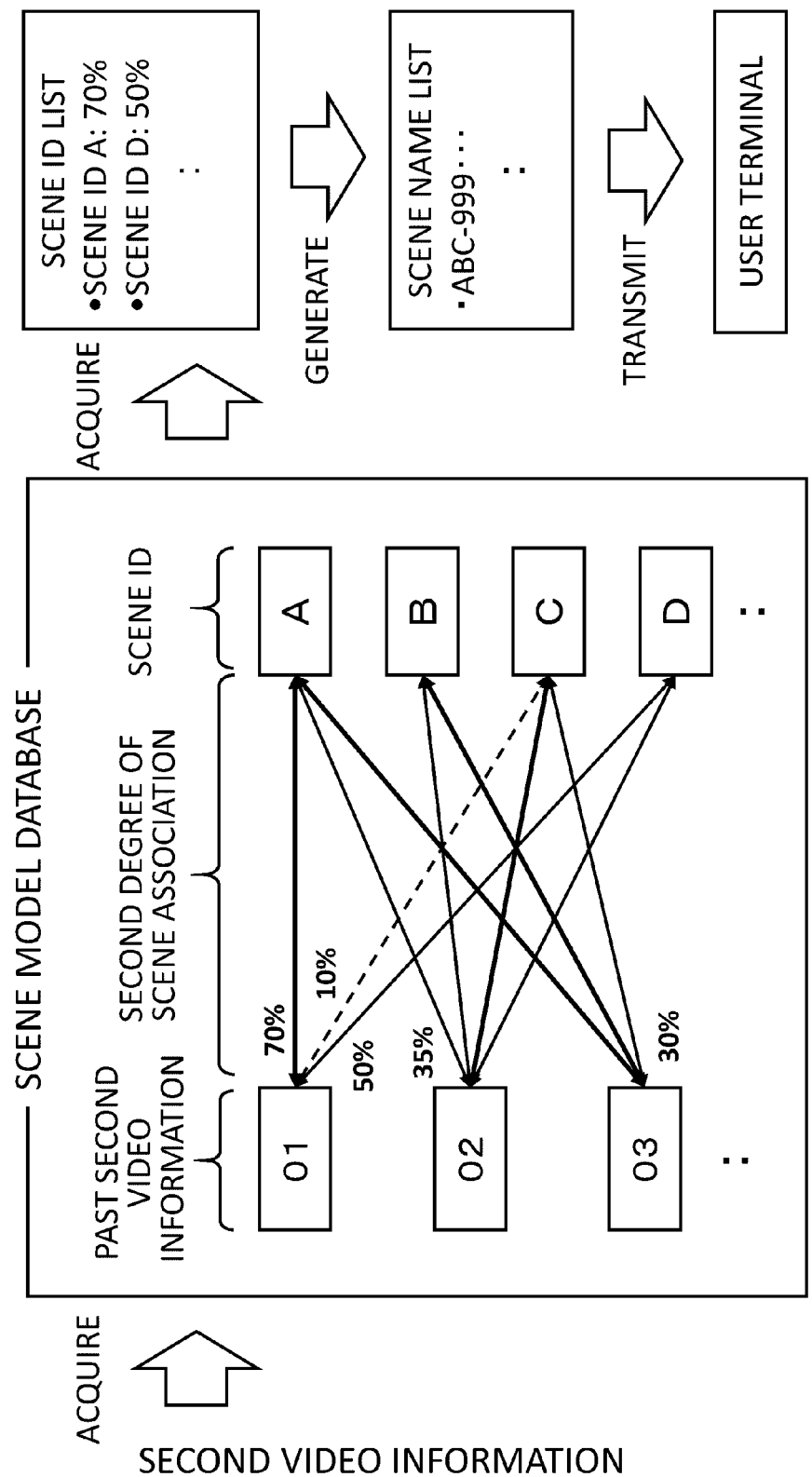
FIG. 2 is a schematic diagram to show an example of the scene model database according to the present embodiment.

FIG. 2 is a schematic diagram to show an example of the scene model database 3 according to the present embodiment. The scene model database 3 stores past second video information, which is acquired in advance, scene information, which includes scene IDs linked with the past second video information, and three or more levels of degrees of scene association, which represent the degrees of scene association between the past second video information and the scene information. The second video information includes, for example, video taken by the camera or the like of the user terminal 7 the worker holds in the field. The second video information may be, for example, either a still image or a movie, may be taken by the worker, or may be photographed automatically by the setting of the user terminal 7. Furthermore, the second video information may be read into the video information recorded in the memory or the like of the user terminal 7, or may be acquired via the public communication network 6.

The scene model database 3 is built of second video information, which is acquired by machine learning, and evaluation results of past second video information and scene IDs, and, for example, each relationship between these is stored as a degree of scene association. For example, "01" of the past second video information is stored such that its degree of scene association is 70% with the scene ID "A", 50% with the scene ID "D", 10% with the scene ID "C", and so on. As for the first video information acquired from the user terminal 7, evaluation results of, for example, its similarity with past second video information, which is acquired in advance, are built by machine learning. For example, by performing deep learning, it is possible to deal with information that is not the same but is similar.

The scene model database 3 stores past second video information, which is acquired in advance, scene information, which includes scene IDs linked with the past second video information, and three or more levels of second degrees of scene association, which represent the degrees of scene association between the past second video information and the scene information. The second evaluation means looks up the scene model database 3, selects past second video information that matches, partially matches, or resembles past second video information, selects scene information, including the scene ID linked with the selected past second video information, calculates the second degree of scene association based on the degree of association between the selected past second video information and the scene information, acquires the scene ID including the second degree of scene association calculated, and displays a scene name list that is selected based on a scene ID list, on the user terminal 7.

The scene model database 3 stores a scene ID list. The scene ID list is acquired by a second evaluation unit 212, which will be described later. The scene name list is, for example, a list, in which pairs of past second video information and scene IDs are evaluated based on degrees of scene association calculated by machine learning. The scene model database 3 stores contents, in which these evaluation results form a list. The contents of the list include, for example, scene IDs to show high degrees of scene association, such as "scene ID A: 70%", "scene ID D: 50%", and so on.

The scene model database 3 stores a scene ID list and a scene name list. The scene name list is generated by a third generation unit 213, which will be described later. For example, scene names corresponding to scene IDs are acquired by the second evaluation unit 212, and the list of these scene names is stored in the scene ID list. The scene name list stored in the scene model database 3 is transmitted to the user terminal 7 in later process. The user looks up the scene name list received in the user terminal 7, and finds out which scenes correspond to second video information.

If, due to updating of the scene model database, correction or addition of registered data and so forth, neither scene information corresponding to second video information nor a scene name corresponding to a scene ID is present in the scene model database 3, the process for acquiring the first video information in another field of view may be performed, or a scene name list with an addition of a scene name such as "No applicable scene" may be generated and transmitted to the user terminal 7.

<Content Model Database 4>

Figure 3:
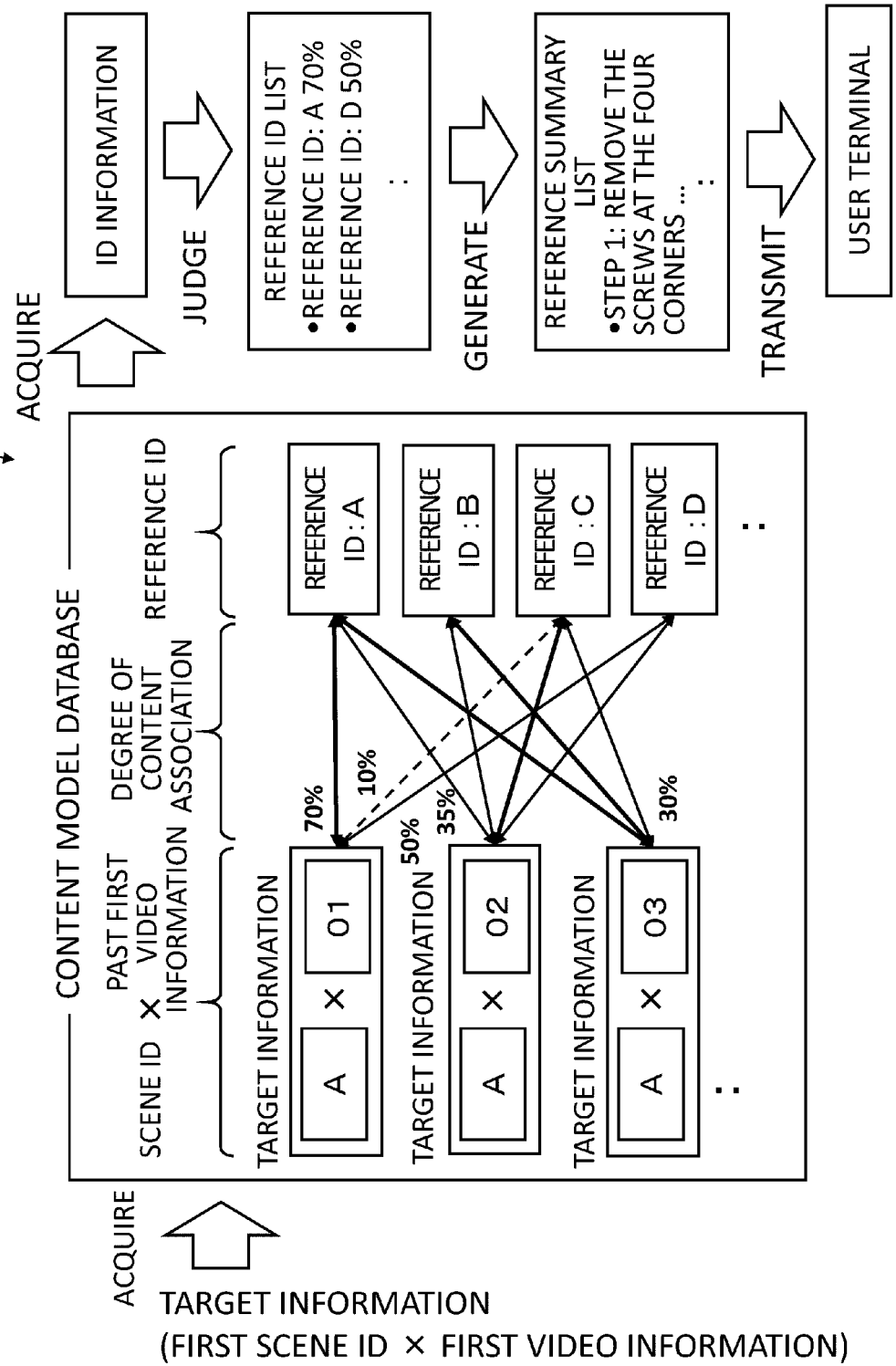
FIG. 3 is a schematic diagram to show an example of the content model database according to the present embodiment.

FIG. 3 is a schematic diagram to show an example of the content model database 4 according to the present embodiment. The content model database 4 stores past target information, in which past first video information, which is acquired in advance, and a scene ID form a pair, reference IDs, which are linked with the past target information, and which correspond to contents, and three or more levels of degrees of content association, which represent the degrees of content association between the past target information and the reference IDs. The video information stored in the content model database 4 is taken by the user terminal 7. The first acquiring means 201 acquires the first video information, which is taken as video information of the field. This first video information includes, for example, video that is taken by the camera or the like of the user terminal 7 the worker holds in the field. The first video information may be, for example, either a still image or a movie, may be taken by the worker, or may be photographed automatically by the setting of the user terminal 7. Furthermore, the first video information may be read into the video information recorded in the memory or the like of the user terminal 7, or may be acquired via the public communication network 6.

The content model database 4 stores first scene IDs with the first video information acquired from the user terminal 7. The first scene IDs refers to a scene name list stored in the scene model database 3, and scene IDs that correspond to scene names selected by the user. The content model database 4 stores these first scene IDs and the first video information as target information. Note that, when work is repeated, the process up to this point is repeated. Note that there may be a plurality of first scene IDs, and, in that case, it follows that a plurality of scene name lists are selected by the user.

The content model database 4 stores past target information, in which past first video information, which is acquired in advance, and a scene ID form a pair, reference IDs, which are linked with the past target information, and which correspond to contents, and three or more levels of degrees of content association, which represent the degrees of content association between the past target information and the reference IDs. The first evaluation means looks up the content model database 4, selects past first video information that matches, partially matches, or resembles past first video information, and scene IDs, selects the reference IDs linked with the past first video information that is selected and the target information, calculates the first degrees of association based on the degrees of association between the selected past first video information and the target information, and acquires the ID information (reference IDs) including the first degrees of scene association that are calculated. The judging means judges the ID information acquired. Based on the results of judgement, the output means displays a reference summary list, which is selected based on a reference ID list, on the user terminal 7.

Evaluation results to show high similarity between target information and reference IDs may be calculated such that, for example, if the target information is "A×01", its degree of association is 70% with the reference ID "reference ID: A", 50% with the reference ID "reference ID: D", and 10% with the reference ID "reference ID: C". As for the target information acquired in the second acquiring means, for example, the similarity to the target information is evaluated. This process may be performed via AI image processing or the like (not shown). By using AI image processing, the process of each stage can be performed in a much shorter time than conventional processing.

Next, the content model database 4 stores a reference ID list. The reference ID list is acquired by the first evaluation means. For example, pairs of target information and reference information linked with past first video information and reference IDs are evaluated based on degrees of content association built by machine learning. Based on the results of evaluation, the reference IDs of evaluation results showing high degrees of association are listed up. The reference ID list is built of reference IDs with high degrees of content association such as, for example, "reference ID: A 70%", "reference ID: D 50%", and so on, and stored in the content model database 4.

Next, the content model database 4 stores the reference ID list acquired in the first evaluation means, and a reference summary list generated by the second generation means. The reference summary list is recorded in a content table, which will be described later, based on reference IDs that are identified in the reference ID list. The second acquiring unit 206 acquires the "summaries" registered in the content table stored in the content model database 4. The second acquiring unit 206 acquires a reference ID list, which includes first degrees of content association with the reference IDs. The second generation unit 208 generates a reference summary list based on the summary information acquired. The reference summary list generated by the second generation unit 208 is transmitted to the user terminal 7.

Note that, if, due to updating of the content model database 4, correction or addition of registered data and so forth, there is no data that corresponds to a scene ID, such as a reference ID, content or a summary, in the content model database 4, for example, a scene ID that is prepared as an alternative for such a case where there is no corresponding data may be newly associated, and the associated alternative content may be transmitted to the user terminal 7.

Also, the first evaluation unit 202 looks up the content model database 4, and acquires ID information, which includes the degrees of content association between the target information and the reference IDs. Following this, the judging unit 203 looks up a transition information table, and makes judgements based on the ID information acquired. The contents that correspond to the ID information are output from the output unit 204 to the user terminal 7, based on the results of judgements made in the judging unit 203.

After that, the ID information acquired by the first evaluation unit 202 is stored in the content database 4. As for the storage of ID information, after the output from the output unit 204, the ID information acquired by each acquiring means is stored in an ID information storage table, by way of an ID history unit 214.

<Management Server 2>

Figure 4A:
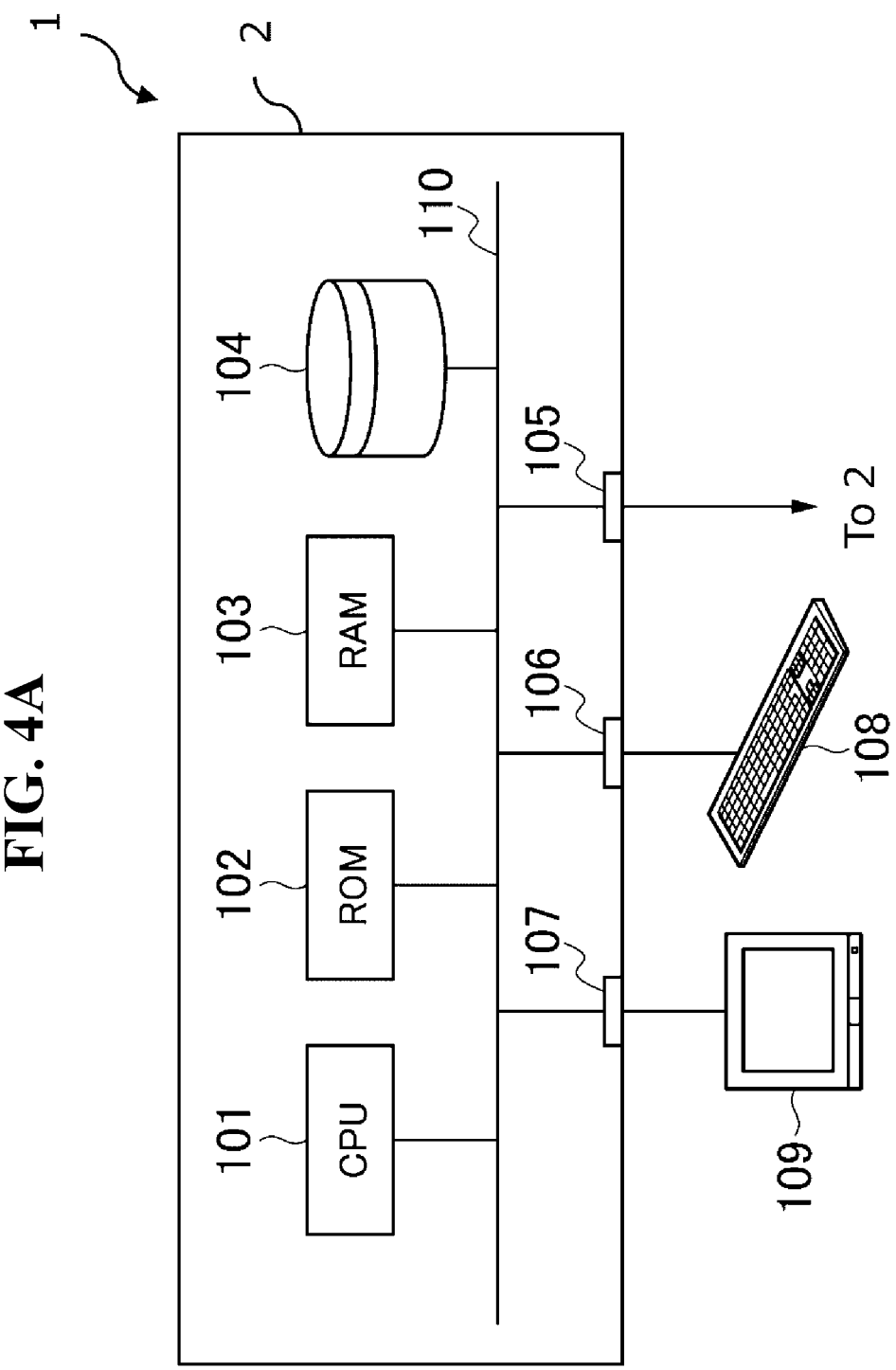
FIG. 4A is a schematic diagram to show an example of the configuration of the user device of the information providing system according to the present embodiment.

FIG. 4A is a schematic diagram of a management server 2 of the information providing system 1. Regarding the management server 2, the management server 2 has a housing 10, a CPU (Central Processing Unit) 101, a ROM (Read Only Memory) 102, a RAM (Random Access Memory) 103, a storage unit 104, and I/Fs 105 to 107. The configurations 101 to 107 are connected by an internal bus 110.

The CPU 101 controls the whole of the management server 2. The ROM 102 stores the operation codes for the CPU 101. The RAM 103 is the work area that is used when the CPU 101 operates. The storage unit 104 stores a variety of types of information such as measurement information. For the storage unit 104, for example, an SSD (Solid State Drive) or the like is used, in addition to an HDD (Hard Disk Drive).

The I/F 105 is an interface for transmitting and receiving a variety of types of information to and from the user terminal 7, via the public communication network 6. The I/F 106 is an interface for transmitting and receiving information to and from the input part 108. For example, a keyboard is used for the input part 108, and the administrator, the worker, the content administrator and so forth to use the information providing system 1 inputs or selects a variety of types of information, or control commands for the management server 2, via the input part 108. The I/F 107 is an interface for transmitting and receiving a variety of types of information to and from the output part 109. The output part 109 outputs a variety of types of information stored in the storage unit 104, or the status of processing in the management server 2, and so forth. A display may be used for the output part 109, and this may be, for example, a touch panel type. In this case, the output part 109 may be configured to include the input part 108.

Figure 4B:
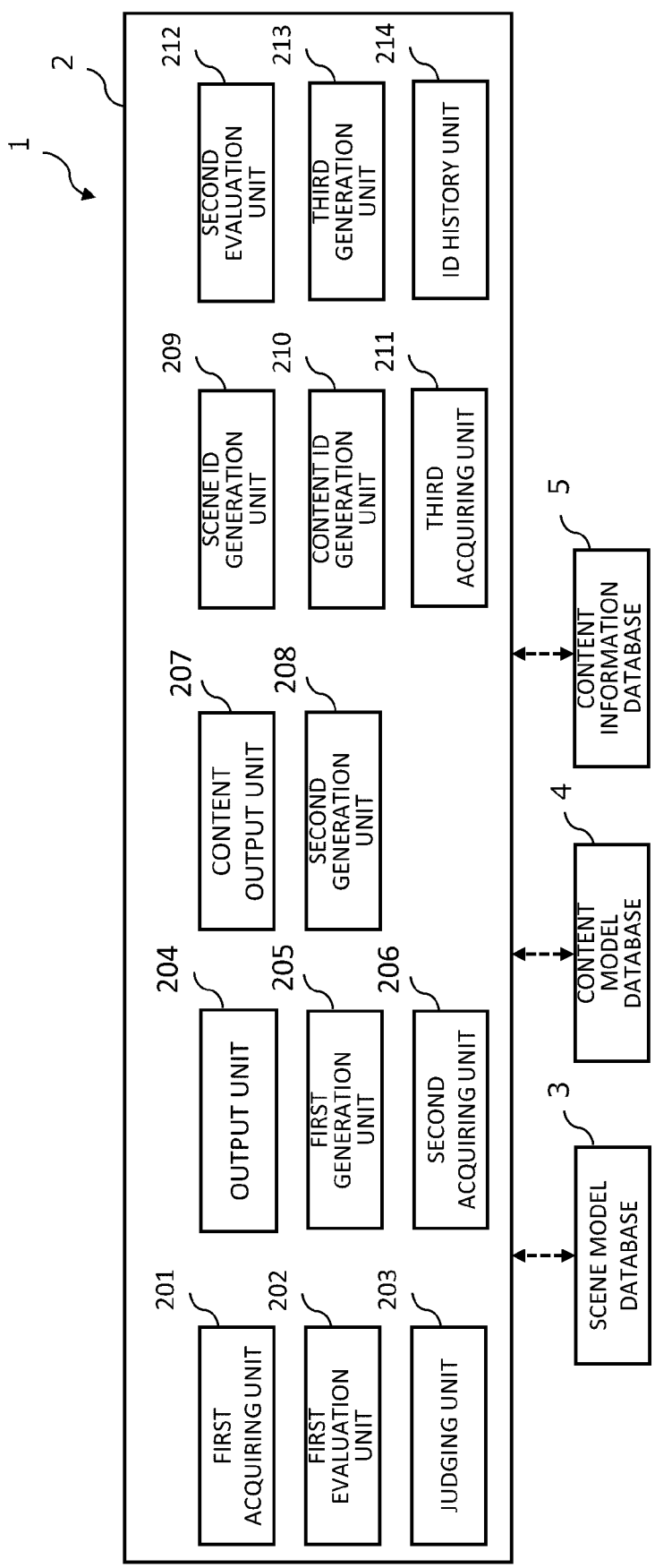
FIG. 4B is a schematic diagram to show examples of functions of the management server of the information providing system according to the present embodiment.

FIG. 4B is a schematic diagram to show examples of functions of the management server 2. The management server 2 has a first acquiring unit 201, a first evaluation unit 202, a judging unit 203, an output unit 204, a first generation unit 205, a second acquiring unit 206, a content output unit 207, a second generation unit 208, a scene ID generation unit 209, which includes a first learning means, a content ID generation unit 210, which includes a second learning means, a third acquiring unit 211, a second evaluation unit 212, a third generation unit 213, and an ID history unit 214. The management server 2 is connected with a scene model database 3, a content model database 4, and a content information database 5. Note that each function shown in FIG. 4B is implemented by the CPU 101 executing the programs stored in the storage unit 104 and the like, using the RAM 103 as the work area. Furthermore, each function may be controlled by, for example, artificial intelligence. Here, "artificial intelligence" may be based on any artificial intelligence technology that is known.

<First Acquiring Unit 201>

The first acquiring unit 201 acquires first video information from the user terminal 7. The first video information shows devices or parts, taken by the worker, or taken by using, for example, an HMD (Head-Mounted Display) or HoloLens. Video that is taken may be transmitted to the management server 2 on a real time basis. Furthermore, video that is being taken may be acquired as first video information.

<First Evaluation Unit 202>

The first evaluation unit 202 looks up the content model database 4, and acquires ID information (reference ID list), which includes first degrees of content association between the target information and the reference IDs. The scene list that is acquired includes, for example, "reference IDs", "degrees of content association", and so forth, and includes scene IDs that have high degrees of association with the target information.

<Judging Unit 203>

The judging unit 203 judges the ID information acquired in the first evaluation unit 202. The judging unit 203 looks up the transition information table, in which information about the order of content outputs corresponding to the ID information is stored in advance. The judging unit 203 judges, based on scene IDs that are associated with the acquired ID information, whether or not order information for the content IDs related to the scene IDs is stored in the transition information table.

<Output Unit 204>

The output unit 204 outputs the contents that correspond to the acquired ID information (first reference ID). The contents are acquired from the content information database 5. The content to output is acquired, for example, from the content table shown in FIG. 6. The content table is stored in, for example, the content information database 5. In the content table, for example, scene IDs, reference IDs, contents, summaries and hash values are associated with one another and registered. One first reference ID is associated with a plurality of pieces of meta information. For example, the meta information shown in FIG. 8 is assigned to a first reference ID. The meta information is linked by means of a meta-table, a meta-category master table, and a meta-master table.

<First Generation Unit 205>

The first generation unit 205 generates a reference ID list, which includes a plurality of pieces of ID information, based on the result of judgement in the judging unit 203.

<Second Acquiring Unit 206>

The second acquiring unit 206 acquires, via the user terminal 7, the first reference ID selected from the reference summary list.

<Content Output Unit 207>

The content output unit 207 outputs the contents that correspond to the first reference ID, to the user terminal 7.

<Second Generation Unit 208>

The second generation unit 208 generates a reference summary list, corresponding to the ID information that was evaluated in the first evaluation unit 202 and acquired. The reference summary list is generated based on summary information stored in a content table, which will be described later.

<Scene ID Generation Unit 209>

The scene ID generation unit 209 has a scene name acquiring unit, a scene ID generation unit and a first learning unit. For example, the scene ID generation unit 209 determines the character length of scene names that are acquired, and generates scene IDs with smaller amounts of information than the scene names, the character length of which has been determined, for every scene name that is acquired. By this means, the scene IDs generated carry smaller amounts of information than scene names.

<Scene Name Acquiring Unit>

A scene name acquiring unit looks up the scene table stored in the scene model database 3, and acquires past second video information, which is acquired in advance, and scene names corresponding to the past second video information.

<First Learning Unit>

The first learning unit generates a scene model database 3, by way of machine learning using scene information, which at least includes the scene IDs generated, and the past second video information.

<Content ID Generation Unit 210>

The content ID generation unit 210 has a content acquiring unit, a content ID generation unit, and a second learning means. For example, when content is acquired, the content ID generation unit 210 determines the acquired content's file name, its related information, or the character length of its text and so forth, and generates a content ID with a smaller amount of information than the data capacity of the content, the character length of which has been determined, for every content that is acquired. Furthermore, the content ID generation unit 210 generates content IDs with smaller amounts of information than contents, for every content that is acquired. By this means, the content IDs generated here carry smaller amounts of information than contents.

<Content Acquiring Unit>

The content acquiring unit looks up the content table stored in the content model database 4, and acquires contents that correspond to the past first video information and past second video information which are acquired in advance.

<Second Learning Unit>

The second learning unit generates a content model database 4, by way of machine learning using reference information, which at least includes the content IDs that are generated, and past target information.

<Third Acquiring Unit 211>

The acquiring unit 211 acquires, from the user terminal 7, target information, in which second video information and a first scene ID, corresponding to a scene name selected from the scene name list, form a pair.

<Second Evaluation Unit 212>

The second evaluation unit 212 looks up the scene model database 3. The scene model database 3 stores past second video information, which is acquired in advance, scene information, which includes scene IDs linked with the past second video information, and three or more levels of degrees of scene association, which represent the degrees of scene association between the past second video information and the scene information. The second evaluation unit 212 acquires a scene ID list, which includes first degrees of scene association between second video information and the scene information.

<Third Generation Unit 213>

The third generation unit 213 generates a scene name list, which corresponds to the scene ID list acquired in the second evaluation unit 212. The scene ID list generated here includes, for example, "scene IDs", "degrees of scene ID association", and so forth, and scene IDs having high degrees of association with the past second video information. The scene IDs are generated, for example, based on the scene model table shown in FIG. 5A and the scene content model table (OFE) shown in FIG. 5B. The scene model table records, for example, information such as scene IDs, reference IDs, learning models and so forth, and the scene table records scene IDs, scene names and so forth. The third generation unit 213 generates a scene name list based on these pieces of information.

<User Terminal 7: Receiving Means>

A receiving means is provided in the user terminal 7, and receives the scene ID list acquired in the second evaluation unit 212. Furthermore, the reference ID list acquired by the third acquiring unit 211 is received.

<User Terminal 7: Judging Means>

A judging means is provided in the user terminal 7, and judges whether the scene IDs included in the received scene ID list are present in the cache area of the user terminal, based on the result of receiving the scene ID list. Also, the judging means judges whether or not the reference IDs included in the received reference ID list are present in the cache area of the user terminal 7, based on the result of receiving the reference ID list. If there is a scene ID list or a reference ID list in the cache area, the judging means checks that list first. The cache is given in the form of, for example, the name cache table and the summary cache table shown in FIGS. 7A and 7B.

In the name cache table, for example, scene IDs and scene names are associated and stored. Also, in the summary cache table, for example, reference IDs are associated and stored for reference.

<User Terminal 7: Inquiring Means>

If the result of judgement in the judging means indicates that the reference IDs are not present in the cache area of the user terminal, the inquiring means in the user terminal 7 makes an inquiry to the content information database 5 that holds contents.

Next, FIG. 5A is a schematic diagram to show an example of the configuration of the scene model table according to the present embodiment. FIG. 5B is a schematic diagram to show an example of the configuration of the scene content model table (for OFE).

First, the scene model table shown in FIG. 5A is stored in the scene model database 3. For example, scene IDs that identify each work to be performed by the worker in the field and learning models corresponding to these scene IDs are associated and stored in the scene model table. A plurality of scene IDs are present, and stored in association with the learning models of video information corresponding to each of those scenes.

Next, in the scene content model table shown in FIG. 5B, each scene's reference ID and a learning model are associated and stored. The scene content model table shown in FIG. 5B shows, for example, an example in which the scene ID is "OFE", and reference IDs to correspond to various scenes are stored separately. A plurality of scene IDs are present, and stored in association with the learning models of video information corresponding to each of those scenes. Note that there may be a case where no content is present for the learning model of video information corresponding to a scene. In this case, for example, "NULL" is stored for the reference ID.

Next, FIG. 6A is a schematic diagram to show an example of a scene table. The scene table shown in FIG. 6A is stored in the scene model database 3. For example, an outline of the video information of each work the worker performs in the field, and a scene ID to identify the work of that outline are associated and stored. A plurality of scene IDs are present, each scene ID being associated with a corresponding scene name and stored.

Next, FIG. 6B is a schematic diagram to show an example of a content table. The content table shown in FIG. 6B is stored in the content model database 4. In the content table, for example, scene IDs, reference IDs, contents, summaries of contents, and hash values are associated and stored. A plurality of scene IDs are present, each scene ID being associated with a corresponding content summary and stored. Based on the video information acquired from the user terminal 7, a plurality of contents to be output to the user terminal 7 are stored in the content table. Note that the reference IDs may include content that specifies no scene. In this case, "NULL" is stored for the scene ID.

Next, FIG. 6C is a schematic diagram to show an example of the transition information table. The transition information table shown in FIG. 6C stores, for example, information related to the judging of ID information (reference IDs) in the judging unit 203, which has been described earlier. For example, scene IDs, content IDs to identify the contents linked with the scene IDs, whether or not there is content to be displayed for the scene (for example, the location of work, the situation of work, and so forth) specified by each scene ID, and the display order of the contents to be displayed, are stored in the transition information table.

Next, FIG. 7A is a schematic diagram to show an example of the configuration of a name cache table, and FIG. 7B is a schematic diagram to show an example of the configuration of a summary cache table according to the present embodiment, and these are stored in the storage area of the user terminal 7. The user terminal 7 receives, for example, the scene ID list generated in the management server 2, and stores this in the storage area. The user terminal 7 looks up the scene ID list stored in the user terminal 7, and, based on the result of this, returns a scene name list to the management server 2, so that efficient narrowing becomes possible.

Furthermore, the user terminal 7 receives, for example, the reference ID list generated in the management server 2, and stores this in the storage area. The user terminal 7 looks up the reference ID list stored in the user terminal 7, and, based on the result of this, returns a reference ID list to the management server 2, so that efficient narrowing becomes possible.

Next, FIG. 8A is a schematic diagram to show an example of the configuration of a meta-table, FIG. 8B is a schematic diagram to show an example of the configuration of a meta-category master table, and FIG. 8C is a schematic diagram to show an example of the configuration of a meta-master table.

First, in the meta-table shown in FIG. 8A, reference IDs and meta IDs are associated and stored in the content model database 4. In the meta-table, for example, a plurality of meta IDs may be assigned to one content. The meta-category master table shown in FIG. 8B and the meta-master table shown in FIG. 8C are designed to manage the classification of meta information. For example, instead of information that changes depending on the model or the product, such as "model name", "series name" and others, attributes to simply represent the object's properties such as "color", "weight", and so forth are selected and stored.

(Judging Operation in Information Providing System 1)

Figure 9:
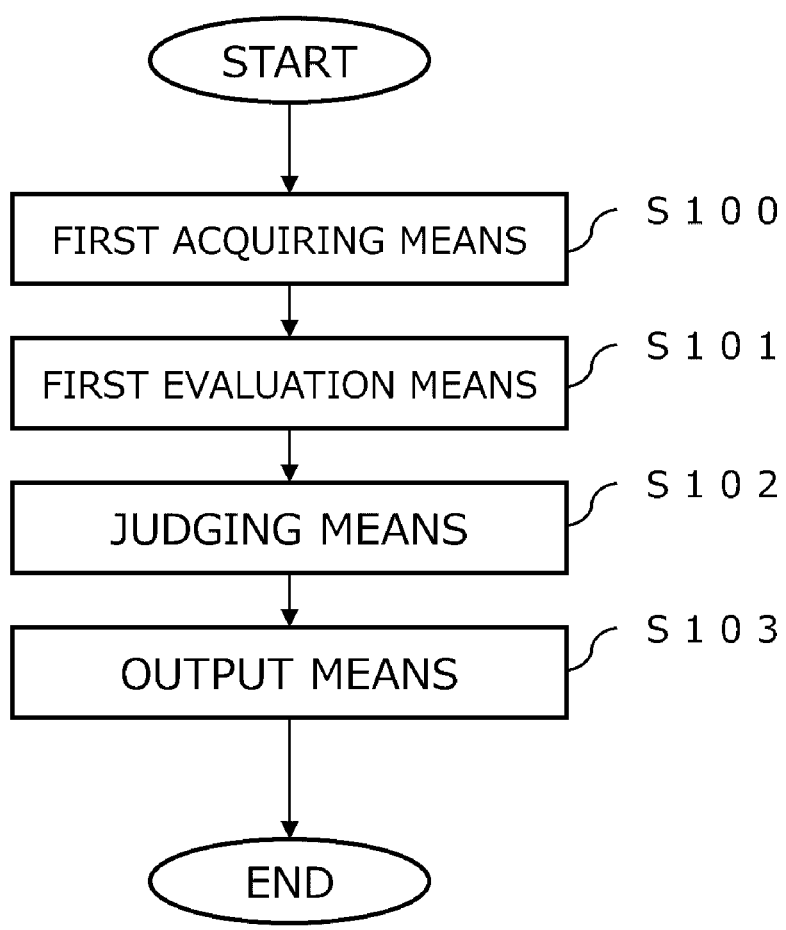
FIG. 9 is a flowchart to show an example of the judging operation in the information providing system according to the present embodiment.

Next, examples of the operations of the information providing system 1 according to the present embodiment will be described. FIG. 9 is a flowchart to show an example of the operation of the information providing system 1 according to the present embodiment.

The content model database 4 stores past target information, which includes past first video information acquired in advance, reference IDs, which are linked with past target information and which correspond to contents, and three or more levels of degrees of content association, which represent the degrees of content association between the past target information and the reference IDs.

<First Acquiring Means S100>

A first acquiring means S100 acquires target information from the user terminal 7. The target information includes first video information. Note that the first acquiring means S100 may acquire, from the user terminal 7, target information, in which first video information and a first scene ID, which corresponds to a scene name selected from the scene name list, form a pair.

The first acquiring means S100 acquires first video information from the user terminal 7. The first video information shows devices or parts, taken by the worker, or taken by using, for example, an HMD (Head-Mounted Display) or HoloLens. The first video information that is taken may be, for example, transmitted to the management server 2 on a real time basis, via the user terminal 7, by application functions of the user terminal 7 provided by the management server 2 or the like.

Figure 14A:
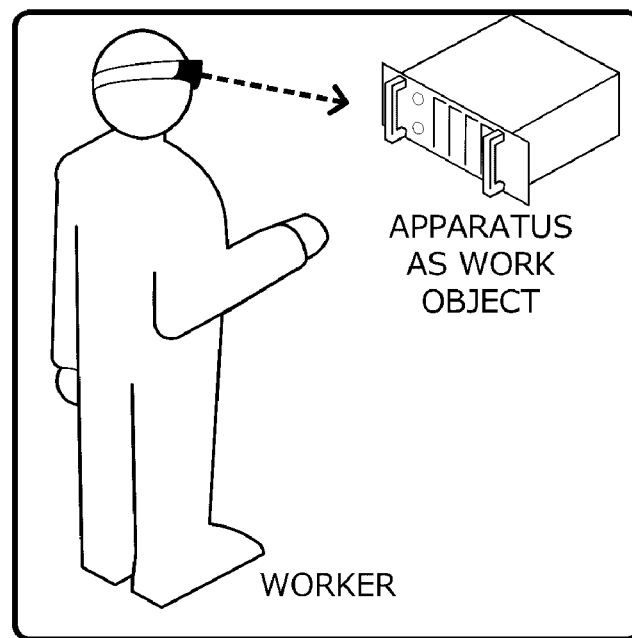
FIG. 14A is a schematic diagram to show an example of the third acquiring means according to the present embodiment.
Figure 14B:
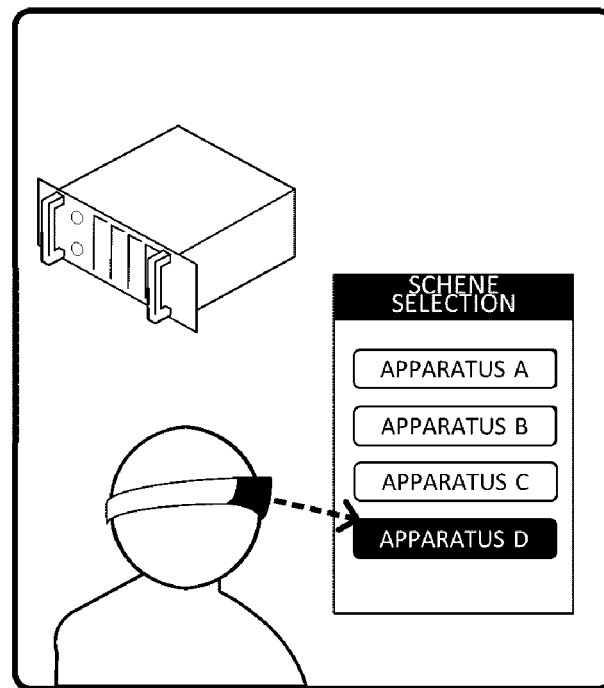
FIG. 14B is a schematic diagram to show an example of the second acquiring means according to the present embodiment.

For example, as shown in FIG. 14B, the first acquiring means S100 acquires target information, in which a scene name (apparatus D), selected by the first acquiring unit 201 via the user terminal 7, and a first scene ID corresponding to the scene name, form one pair.

<First Evaluation Means S101>

The first evaluation means 101 looks up the content model database 4, and acquires ID information (reference ID list), which includes first degrees of content association between the target information and the reference IDs. In the ID information, for example, information such as reference IDs and degrees of content association is listed.

The first evaluation means S101 looks up the content model database 4, which stores past target information, including past first video information acquired in advance, reference IDs, which are linked with past target information and which correspond to contents, and three or more levels of degrees of content association, which represent the degrees of content association between the past target information and the reference IDs, and acquires ID information, including first degrees of content association between the target information and the reference IDs.

The first evaluation means S101 acquires ID information, showing high degrees of association with the target information, based on, for example, "reference ID", "degree of content association", and so forth.

<Judging Means S102>

The judging means S102 judges the ID information acquired in the first evaluation means S101. The judging means S102 looks up a transition information table, in which information about the order of content outputs corresponding to the ID information is stored in advance, and judges whether or not order information for the content IDs that relate to the scene IDs associated with the acquired ID information is stored.

If, amongst the scene IDs, there is order information that corresponds to the ID information that is acquired as a result of judgement as to whether or not order information is present, the judging means S102 judges, for example, that the ID information acquired in the first evaluation unit 202 shows a prediction result that matches the situation of the worker's field. On the other hand, when order information is not stored in the scene IDs associated with the acquired ID information, the judging means S102 judges that there are no contents corresponding to the acquired ID information.

Furthermore, the judging means S102 looks up the transition information table judges whether or not there is order information related to content outputs corresponding to the ID information. When there is no order information corresponding to the ID information acquired in the first acquiring means S100, the judging means S102 judges that there is no content that corresponds to the ID information.

<Output Means S103>

Figure 14C:
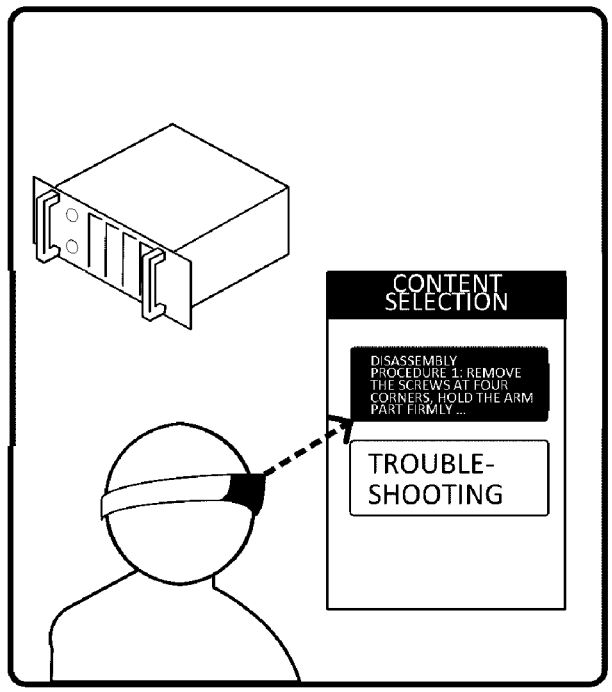
FIG. 14C is a schematic diagram to show an example of the first acquiring means according to the present embodiment.
Figure 14D:
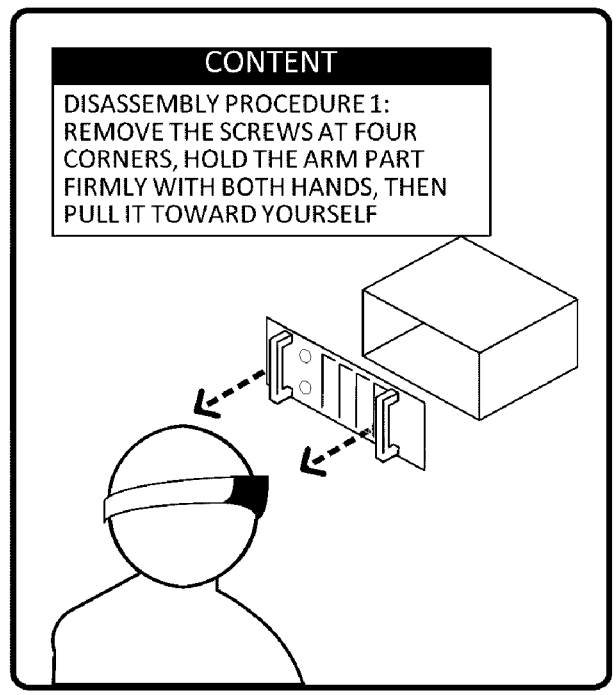
FIG. 14D is a schematic diagram to show an example of the output means according to the present embodiment.

An output means S103 outputs contents that correspond to the acquired ID information. To output contents from the output means S103, contents are acquired from the content information database 5 and output to the user terminal 7. For example, as shown in FIG. 6B, when the reference ID is "1B827-02", the content to output is "1B827-02/1.pdf". This file is output to the user terminal 7. To output contents to the user terminal 7, for example, contents are selected from the reference summary list corresponding to the first reference ID, and output to the user terminal 7, as shown in FIG. 14D.

By this means, the operation of the information providing system 1 of the present embodiment ends.

Second Embodiment

<Content Output Operation in Information Providing System 1>

Figure 10:
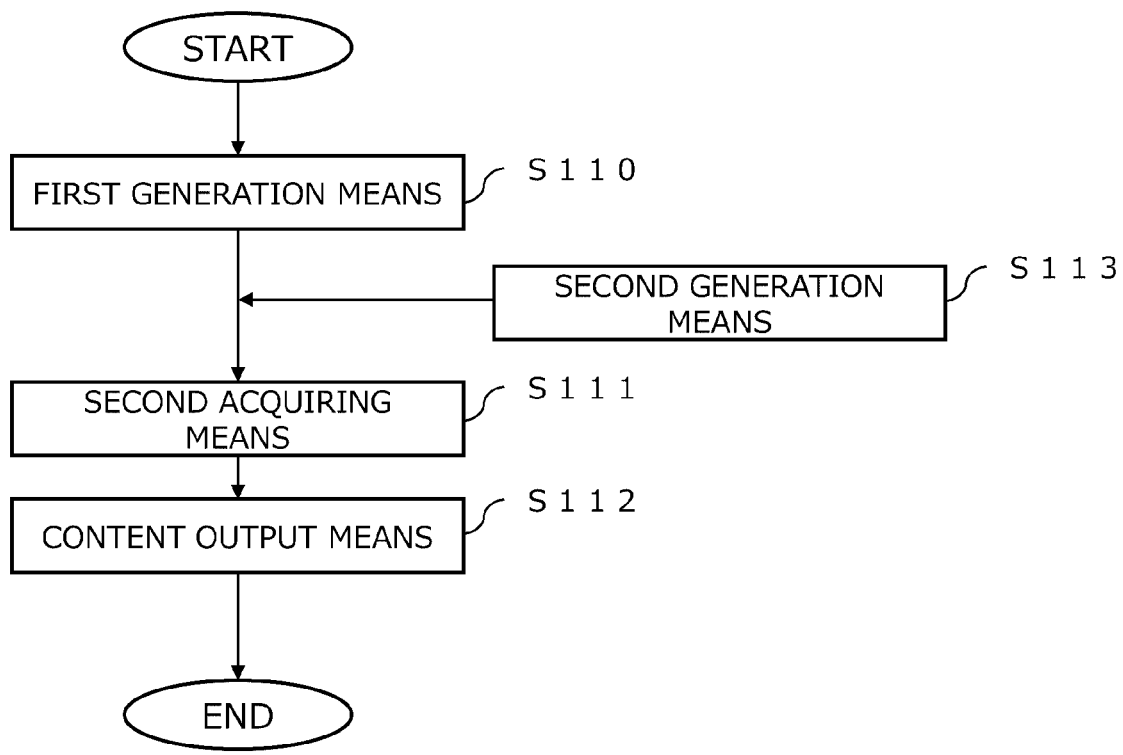
FIG. 10 is a flowchart to show an example of the operation of outputting contents in the information providing system according to the present embodiment.

Next, examples of the content output operation in the information providing system 1 according to the present embodiment will be described. FIG. 10 is a flowchart to show an example of the content output operation in the information providing system according to the present embodiment.

The output unit 204 has a first generation unit 205 that generates a reference ID list, which includes a plurality of pieces of ID information, based on the result of judgement in the judging unit 203, a second acquiring unit 206 that acquires first reference IDs included in the reference ID list from the user terminal 7, and a content output unit 207 that outputs contents corresponding to the first reference IDs to the user terminal 7.

Furthermore, following the first generation means S110 in the first generation unit 205, the output unit 204 has a second generation unit 208 that generates a reference summary list, which includes a plurality of summaries that correspond to a plurality of pieces of ID information included in the reference ID list. The second acquiring unit 206 acquires a first summary selected from the reference summary list via the user terminal 7, and acquires the first reference ID corresponding to the first summary, from the reference ID list.

<First Generation Means S110>

The first generation means S110 generates a reference ID list, which includes a plurality of pieces of ID information, based on the result of judgement in the judging means S102. When the first generation means S110 generates the reference ID list, for example, as shown in FIG. 3, reference IDs corresponding to a plurality of pieces of ID information, including the degrees of content association with the reference IDs, are identified based on the result of judgement in the judging unit 203, and a reference ID list is generated from the plurality of reference IDs identified.

<Second Generation Means S113>

Following the first generation means S110, the second generation means S113 generates a reference summary list, which includes a plurality of summaries that correspond to a plurality of pieces of ID information included in the reference ID list.

Given the reference summary list generated by the second generation means S113, for example, summaries corresponding to reference IDs is acquired from the content table shown in FIG. 6B, based on ID information (reference ID). For example, if the reference ID is "1B827-02", the reference summary list gives "Step 1: Remove the screws at four corners, and hold firmly with both hands . . . ", as the corresponding reference summary. Furthermore, this reference ID summary list may be configured to be recorded in, for example, the cache area of the user terminal 7.

<Second Acquiring Means S111>

The second acquiring means S111 acquires the first reference IDs included in the reference ID list, from the user terminal 7, via the user terminal 7. In the second acquiring means S111, for example, as shown in FIG. 14C, the first reference ID ("Disassembly Procedure 1: Remove the screws at four corners, then, with both hands, . . . "), selected by the user, is acquired from the reference summary list displayed on the user terminal 7. Note that, in the second acquiring means S111, for example, only the target reference IDs are received. By using this configuration, the amount of information to be transferred can be reduced between the user terminal 7 and the management server 2.

<Content Output Means S112>

The content output means S112 outputs the contents that correspond to the first reference IDs, to the user terminal 7. The content output means S112 outputs the contents that correspond to the ID information acquired in the second acquiring means S111. To output contents, contents are acquired from the content information database 5 and output to the user terminal 7. The contents to output are stored in, for example, the content table of FIG. 6, and, when the content ID "1B827-02" is selected, the content to output is "1B827-02/1.pdf". This file is output to the user terminal 7. To output contents to the user terminal 7, for example, as shown in FIG. 14D, contents are selected from the reference summary list corresponding to the ID information, and output to the user terminal 7.

By this means, the content output operation of the information providing system 1 of the present embodiment ends.

Third Embodiment

<Scene Name List Generating Operation of Information Providing System 1 According to Present Embodiment>

Figure 11:
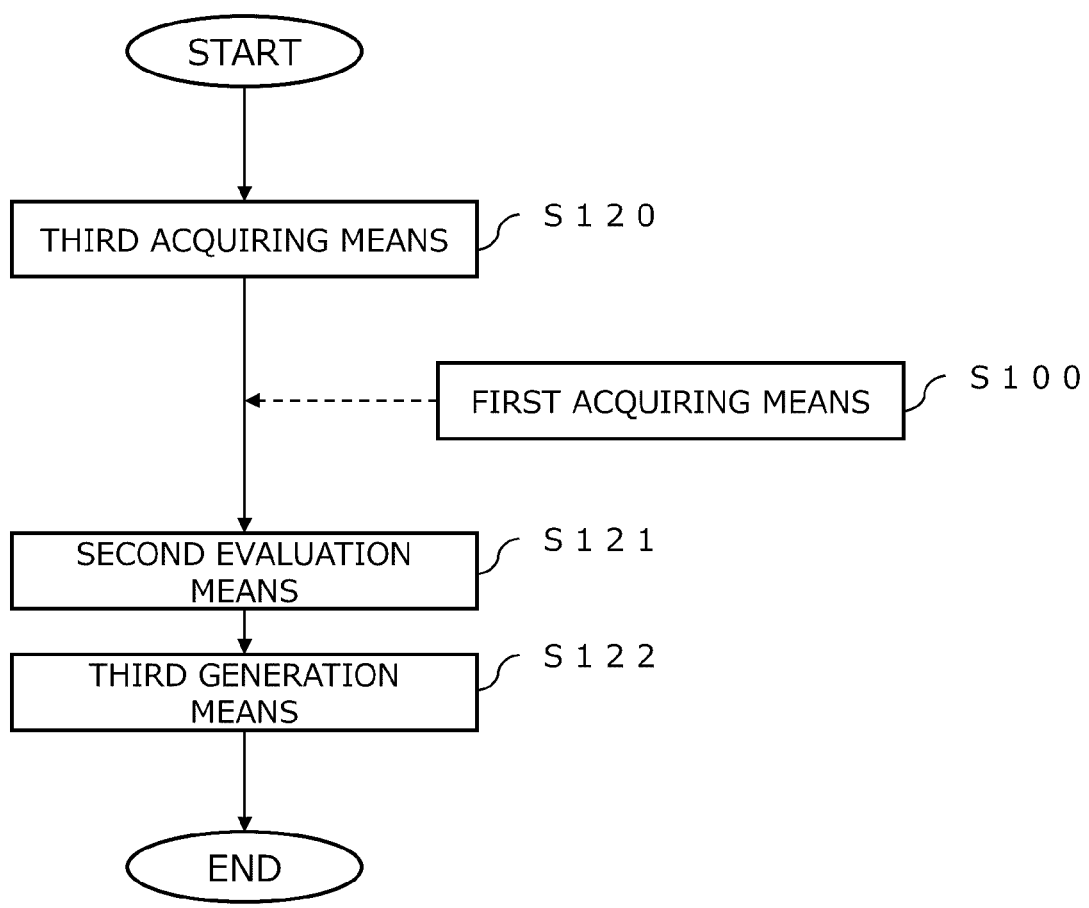
FIG. 11 is a flowchart to show an example of the operation of generating scene name lists in the information providing system according to the present embodiment.

Next, an example of the scene name list generating operation in the information providing system 1 according to the present embodiment will be described. FIG. 11 is a flowchart to show an example of the operation of generating scene name lists in the information providing system 1 according to the present embodiment. Note that the scene model database 3 stores past second video information, which is acquired in advance, scene information, which includes scene IDs linked with the past second video information, and three or more levels of degrees of scene association, which represent the degrees of scene association between the past second video information and the scene information.

<Third Acquiring Means S120>

Before the first acquiring means S100, the third acquiring means S120 acquires target information, including second video information, from the user terminal 7.

<Second Evaluation Means S121>

The second evaluation means S121 looks up the scene model database 3, and acquires a scene ID list, which includes the degrees of scene association between second video information and scene information. As described earlier, the scene model database 3 stores past second video information, which is acquired in advance, scene information, which includes scene IDs linked with the past second video information, and three or more levels of degrees of scene association, which represent the degrees of scene association between the past second video information and the scene information. The second evaluation means S121 acquires a scene ID list, which includes first degrees of scene association between second video information and the scene information.

<Third Generation Means S122>

The third generation means S122 generates a scene name list, which corresponds to the scene ID list acquired in the second evaluation means S121. The scene ID list generated by the third generation means S122 includes, for example, "scene ID", "degree of scene ID association", and so forth, and scene IDs having high degrees of association with past second video information.

The third generation means S122 generates a scene name list based on the scene name list, which corresponds to the scene ID list acquired in the second evaluation means S121.

The third generation means S122, for example, looks up the scene table of FIG. 6A, and generates a corresponding scene name list. For example, if the scene ID "OFD" is included in the scene ID list acquired in the second evaluation means S121, the scene name "Restart ABC-999 Device" is selected as the scene name. For example, when the scene ID is "OFE", the scene name "Remove Memory from ABC-999 Device" is selected as the scene name.

The scene IDs are generated, for example, based on the scene model table shown in FIG. 5A and the scene content model table (OFE) shown in FIG. 5B. In the scene model table of FIG. 5A, for example, information such as scene IDs and learning models are stored. Furthermore, the third generating means S122 may look up the scene table stored in the scene model database 3, and acquire past second video information, which is acquired in advance, and scene names corresponding to the past second video information.

The third generation means S122 may determine the character length of the scene names that are acquired, and generate scene IDs with smaller amounts of information than the scene names, the character length of which has been determined, for every scene name that is acquired. By this means, the scene IDs generated here carry smaller amounts of information than scene names. Furthermore, the third generation unit 430 may generate a scene model database 3, by way of machine learning using scene information, which at least includes the scene IDs generated, and the past second video information.

By this means, the scene name list generating operation in the information providing system 1 of the present embodiment ends.

(Operations of Scene ID Generation Unit 209 and Content ID Generation Unit 210)

Figure 12A:
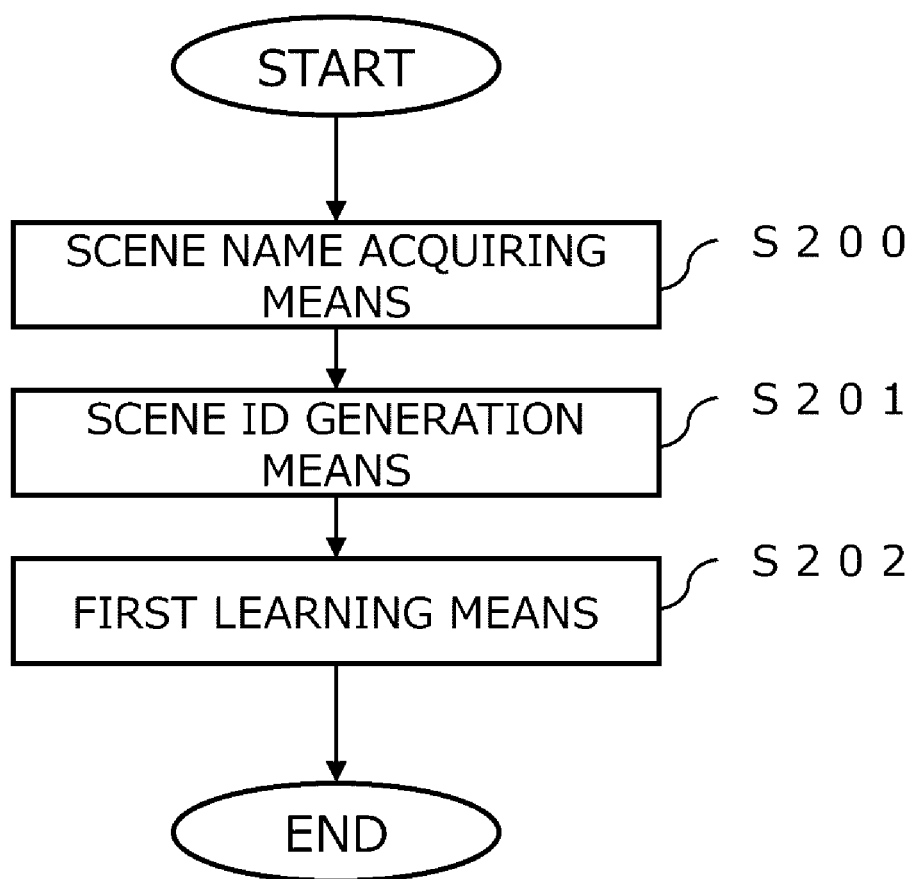
FIG. 12A is a flowchart to show an example of the operation of the scene ID generation unit according to the present embodiment.
Figure 12B:
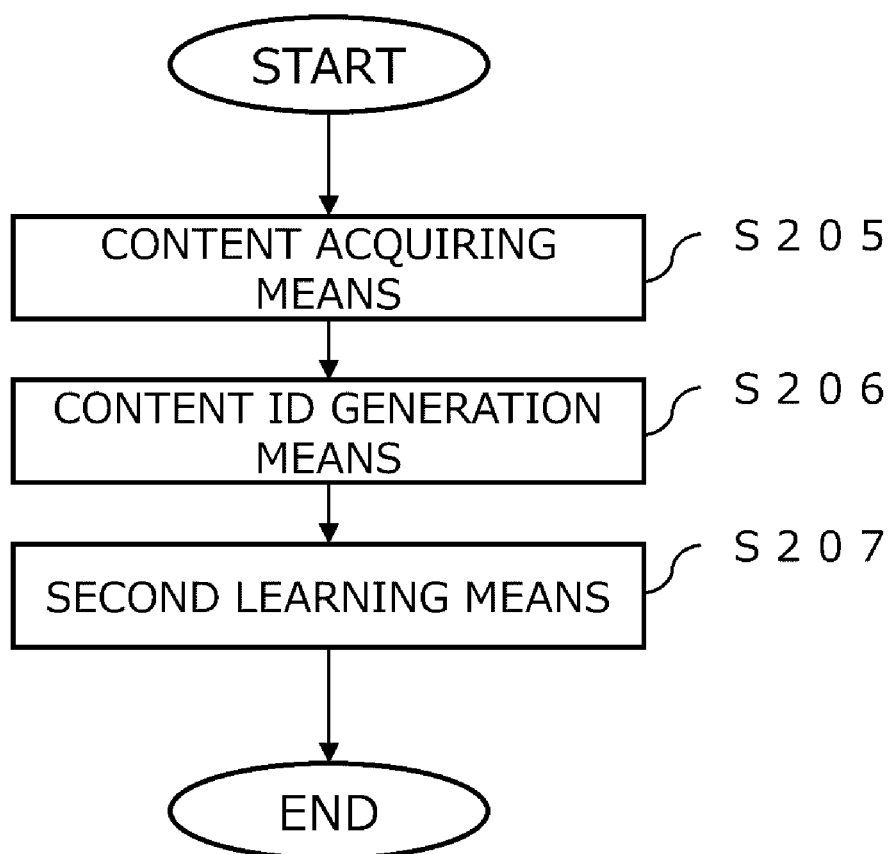
FIG. 12B is a flowchart to show an example of the operation of the content ID generation unit according to the present embodiment.

Next, FIG. 12A is a flowchart to show an example of the operation of a scene ID generation unit according to the present embodiment, and FIG. 12B is a flowchart to show an example of the operation of a content ID generation unit according to the present embodiment.

<Scene ID Generation Means S209>

First, FIG. 12A is a flowchart to show an example of the operation of a scene ID generation means S209 according to the present embodiment.

The scene ID generation means S209 is constituted by a scene name acquiring means S200, a scene ID generation means S201, and a first learning means S202.

<Scene Name Acquiring Means S200>

The scene name acquiring means S200 acquires past second video information, which is acquired in advance, and scene names, which correspond to the past second video information, from the scene model database 3.

<Scene ID Generation Means S201>

The scene ID generation means S201 generates scene IDs with smaller amounts of information than the scene names, for every scene name that is acquired in the scene name acquiring means S200.

<First Learning Means S202>

The first learning means S202 generates the scene model database 3, by way of machine learning using scene information including scene IDs, and past first video information.

Next, FIG. 12B is a flowchart to show an example of the operation of a content ID generation unit 210 according to the present embodiment.

The content ID generation unit 210 is constituted by a content name acquiring means S205, a content ID generation means S206, and a second learning means S207.

<Content Acquiring Means S205>

The content acquiring means S205 acquires past second video information, which is acquired in advance, and contents corresponding to the past second video information, from the content model database 4.

<Content ID Generation Means S206>

The content ID generation means S206 generates content IDs with smaller amounts of information than contents, for every content that is acquired in the content acquiring means S205.

<Second Learning Means S207>

The second learning means S207 generates the content model database 4 based on machine learning using reference IDs, including at least content IDs, and past target information.

Figure 13:
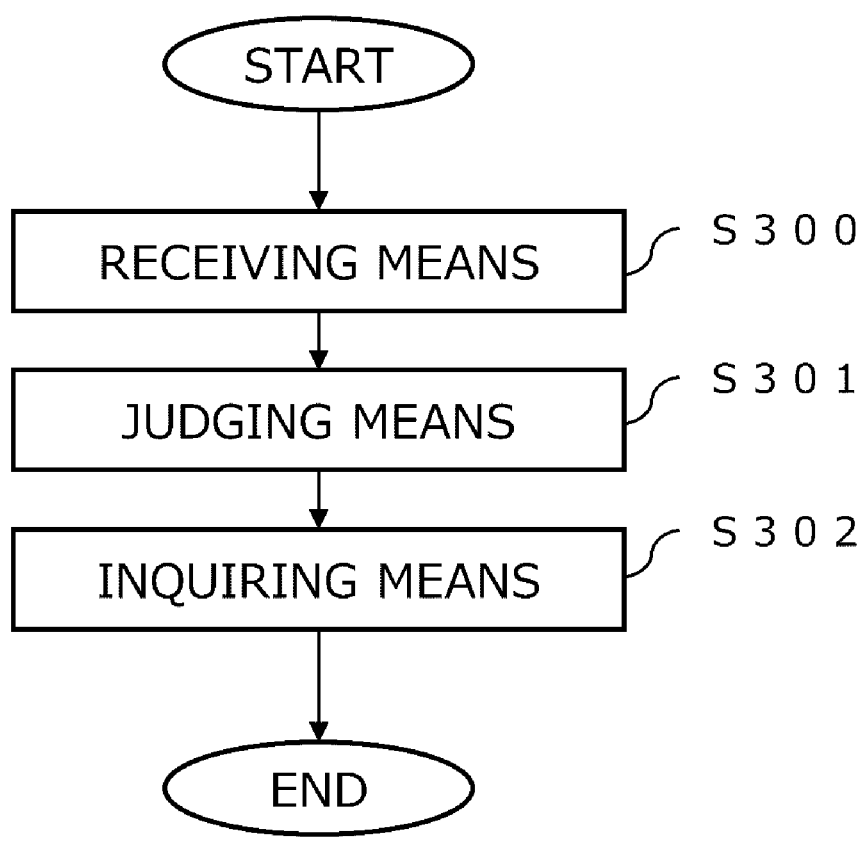
FIG. 13 is a flowchart to show an example of the operation of checking the cache area in the user terminal according to the present embodiment.

FIG. 13 is a flowchart to show an example of the operation of checking the cache area in the user terminal according to the present embodiment.

<Receiving Means S300>

The receiving means S300 receives the scene ID list acquired in the first evaluation means S101, or the reference ID list acquired in the first acquiring means.

<Judging Means S301>

The judging means S301 judges whether or not the scene IDs included in the scene ID list received in the receiving means S300, or the reference IDs included in the received reference ID list, are present in the cache area of the user terminal 7.

<Inquiring Means S302>

If the judging means S301 indicates that the IDs are not present in the cache area of the user terminal 7, the inquiring means S302 makes an inquiry to the content information database 5 that holds contents.

By this means, it is possible to provide appropriate information, efficiently, in the user terminal 7 and the content information database 5.

Furthermore, according to the present embodiment, the scene ID generation unit 209 and the content ID generation unit 210 can generate IDs with smaller amounts of information than scene names or contents. Therefore, the amount of information can be reduced between the user terminal 7 and the management server 2. By this means, the response of narrowing improves between the user terminal 7 and the management server 2. Furthermore, when updating one database to enable exchange using newly-generated IDs, it is only necessary to correct target IDs, and there is no need to update the other database. By this means, the time required for updating can be reduced, and the time and man-hours required to prepare for work in the field, such as maintenance and repair of devices, can be reduced.

Furthermore, the present embodiment has a scene ID generation unit 209, and a scene name acquiring means, a scene ID generation unit 209 and a first learning unit are provided. Consequently, it is possible to acquire scene names stored in the scene model database 3, and generate scene IDs with smaller amounts of information than scene names, for each scene name. As a result of this, it is possible to save the amount of communication to be exchanged, so that quick response is made possible. Furthermore, the scene IDs that are generated are stored in the scene table shown in FIG. 6A. The scene IDs are associated with the content-related information in the content table shown in FIG. 6B. By this means, when updating the scene table of the scene model database 3, it is only necessary to correct the target IDs, and there is no need to update the other content model database 4.

Furthermore, the present embodiment has a content ID generation unit 210, a content acquiring means, a reference ID generation unit, and a first learning unit. Consequently, it is possible to acquire the contents stored in the content model database 4, and generate reference IDs with smaller amounts of information than contents, for each content name. As a result of this, it is possible to save the amount of communication to be exchanged, so that quick response is made possible. Furthermore, the reference IDs that are generated are stored in the content table of FIG. 6B. The reference IDs are associated with the meta information of the meta-table in FIG. 8A. By this means, when updating the content table of the content model database 4, it is only necessary to update the target IDs alone, and there is no need to update the other meta-table.

Furthermore, according to the present embodiment, the user terminal 7 may be any device that has a display unit that is mounted on the head or glasses and that displays information, generated based on the first video information acquired from the user terminal 7, in a transparent state. Consequently, it is possible to narrow down information, using first video information acquired in the management server 2, based on video information that is taken. In order to operate the first video information that is acquired, exchange is made with the management server 2, in accordance with operations made in the user terminal 7. For example, some kind of gesture operation or voice instruction may be used, or operations may be executed based on rules that are set forth between the user terminal 7 and the management server 2. This makes it possible to acquire and provide appropriate information in an efficient manner.

Furthermore, according to the present embodiment, the contents to output from the output unit 204 to the user terminal 7 may be information of part or all of text, illustrations, video, and audio. Consequently, existing information assets can be used on an as-is basis. By this means, a variety of contents can be provided. This makes it possible to provide optimal information to the site from among existing information assets.

Furthermore, according to the present embodiment, a first acquiring unit 201 that implements a first acquiring means S100, a first evaluation unit 202 that implements a first evaluation means S101, a judging unit 203 that implements a judging means S102, and an output unit 204 that implements an output means S103 can provide an information providing method using the information providing system 1.

Therefore, even when dealing with new situations or the like, there is no need to generate a learning model every time, and appropriate information can be provided efficiently, without spending time and money. By this means, states can be narrowed down according to the conditions of the field, and existing information assets can be used on an as-is basis. Furthermore, this makes it possible to provide optimal information to the site from among existing information assets.

Although embodiments of the present invention have been described, each embodiment has been presented simply by way of example, and is not intended to limit the scope of the invention. These novel embodiments can be implemented in a variety of other forms, and various omissions, replacements, and changes can be made without departing from the spirit of the invention. These embodiments and modifications thereof are included in the scope and gist of the invention, and are also included in the invention described in the claims and equivalents thereof.

REFERENCE SIGNS LIST

1: Information providing system
2: Management server
3: Scene model database
4: Content model database
5: Content information database
6: Public communication network
7: User terminal
101: CPU
102: ROM
103: RAM
104: Storage unit
105 to 107: I/F
108: Input part
109: Output part
110: Internal bus
201: First acquiring unit
202: First evaluation unit
203: Judging unit
204: Output unit
205: First generation unit
206: Second acquiring unit
207: Content output unit
208: Second generation unit
209: Scene ID generation unit
210: Content ID generation unit
211: Third acquiring unit
212: Second evaluation unit
213: Third generation unit
214: ID history unit

The invention claimed is:

1. An information providing system for narrowing down a plurality of contents to output to a user terminal, based on target information, which includes first video information acquired from the user terminal, with reference to a database, the information providing system comprising:
    a content model database that stores past target information, which includes past first video information acquired in advance, reference IDs, which are linked with the past target information, and which correspond to the contents, and three or more levels of degrees of content association, which show the degrees of content association between the past target information and the reference IDs; and
    a hardware processor that is configured to:
    acquire the target information from the user terminal;
    look up the content model database, and acquire ID information, which includes the degrees of content association between the target information and the reference IDs;
    judge the ID information; and
    output the contents, which correspond to the ID information, to the user terminal, based on a result of the judgement,
    wherein, in performing the output of the contents, the hardware processor is configured to:
    generate a reference ID list, which includes a plurality of pieces of ID information, based on the result of the judgement;
    acquire a first reference ID, which is included in the reference ID list, from the user terminal; and
    output, as the contents, content which corresponds to the first reference ID, to the user terminal.

2. The information providing system according to claim 1, wherein, in performing the output of the contents, the hardware processor is further configured to generate a reference summary list, which includes a plurality of summaries, corresponding respectively to the plurality of pieces of ID information included in the reference ID list, and acquire a first summary, which is selected from the reference summary list via the user terminal, and acquire the first reference ID, which corresponds to the first summary, from the reference ID list.

3. The information providing system according to claim 1, wherein the database comprises a transition information table, in which order information related to content outputs corresponding to the ID information is stored in advance, and
wherein, in performing the judgement, the hardware processor is configured to look up the transition information table, and judge whether or not the order information related to the content outputs corresponding to the ID information is present.

4. The information providing system according to claim 3, wherein, when there is no order information related to the content outputs corresponding to the acquired ID information in the order information, the processor is configured to judge that there is no content that corresponds to the ID information.

5. The information providing system according to claim 1, wherein the database comprises:
a scene model database that stores past second video information, which is acquired in advance, scene information, which includes scene IDs linked with the past second video information, and three or more levels of degrees of scene association, which show the degrees of scene association between the past second video information and the scene information;
wherein the hardware processor is further configured to:
acquire target information, which includes the second video information, from the user terminal, before acquiring the target information including the first video information from the user terminal;
look up the scene model database, and acquire a scene ID list, which includes degrees of scene association between the second video information and the scene information; and
generate a scene name list, which includes a plurality of scene names corresponding to the scene ID list, and
wherein the hardware processor acquires the target information, which includes the second video information and scene IDs corresponding to scene names selected from the scene name list, from the user terminal.

6. The information providing system according to claim 5, wherein the hardware processor is further configured to:
acquire scene names corresponding to the past first video information and the past second video information, which are acquired in advance;
generate scene IDs with smaller amounts of information than the scene names, for each of the scene names acquired; and
generate the scene model database by way of machine learning using the scene information and the past second video information.

7. The information providing system according to claim 6, wherein the hardware processor is further configured to:
acquire the past second video information, which is acquired in advance, and contents corresponding to the past second video information;
generate content IDs with smaller amounts of information than the contents, for each of the contents acquired; and
generate the content model database by way of machine learning using reference information, which includes at least the content IDs and the past target information.

8. The information providing system according to claim 7, wherein the content IDs are associated with a plurality of pieces of meta information.

9. The information providing system according to claim 5, wherein the user terminal further comprises:
receiving means for receiving the scene ID list;
judging means for judging whether or not a scene ID included in the received scene ID list is present in a cache area of the user terminal, based on a result of receiving the scene ID list; and
inquiring means for making an inquiry to a content information database holding contents, when, according to a result of the judgement, the scene ID is not present in the cache area of the user terminal.

10. The information providing system according to claim 5, wherein the user terminal further comprises:
receiving means for receiving the reference ID list;
judging means for judging whether a reference ID included in the received reference ID list is present in a cache area of the user terminal, based on a result of receiving the reference ID list; and
inquiring means for making an inquiry to a content information database holding contents, when, according to a result of the judgement, the reference ID is not present in the cache area of the user terminal.

11. The information providing system according to claim 1, wherein the user terminal comprises a display unit that is mounted on a head or glasses and that displays information generated based on the first video information acquired from the user terminal, in a transparent state.

12. The information providing system according to claim 1, wherein the contents comprise information of at least part or all of text, illustration, video, and audio.

13. An information providing method for narrowing down a plurality of contents to output to a user terminal with reference to a database, based on first video information acquired from the user terminal, the information providing method comprising:
making a content model data base store past target information, which includes past first video information acquired in advance, reference IDs, which are linked with the past target information, and which correspond to the contents, and three or more levels of degrees of content association, which show the degrees of content association between the past target information and the reference IDs;
acquiring the target information from the user terminal;
looking up the content model database, and acquiring ID information, which includes the degrees of content association between the target information and the reference IDs;
judging the ID information; and
outputting the contents, which correspond to the ID information, to the user terminal, based on a result of judgement in the judging,
wherein said outputting the contents comprises:
generating a reference ID list, which includes a plurality of pieces of ID information, based on the result of judgement;
acquiring a first reference ID, which is included in the reference ID list, from the user terminal; and
outputting, as the contents, content which corresponds to the first reference ID, to the user terminal.

* * * * *